(12) United States Patent
Masuda et al.

(10) Patent No.: US 11,117,539 B2
(45) Date of Patent: Sep. 14, 2021

(54) SEAT DEVICE WITH ARRESTING PORTION

(71) Applicant: TOYODA GOSEI CO., LTD., Kiyosu (JP)

(72) Inventors: Yasushi Masuda, Kiyosu (JP); Shigeyuki Suzuki, Kiyosu (JP); Shigemi Mase, Kiyosu (JP); Hiroaki Yamada, Kiyosu (JP); Tadashi Yamada, Kiyosu (JP); Yuji Sato, Kiyosu (JP); Kenichi Fukurono, Kiyosu (JP); Keisaku Yokoi, Kiyosu (JP); Takafumi Nakanishi, Kiyosu (JP); Takenori Ozaki, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 91 days.

(21) Appl. No.: 16/446,023

(22) Filed: Jun. 19, 2019

(65) Prior Publication Data

US 2019/0389414 A1    Dec. 26, 2019

(30) Foreign Application Priority Data

Jun. 26, 2018 (JP) .............................. JP2018-121042
Mar. 29, 2019 (JP) .............................. JP2019-065998

(51) Int. Cl.
*B60R 21/207* (2006.01)
*B60N 2/42* (2006.01)
(Continued)

(52) U.S. Cl.
CPC .......... *B60R 21/207* (2013.01); *B60N 2/4214* (2013.01); *B60N 2/42763* (2013.01);
(Continued)

(58) Field of Classification Search
CPC .......... B60R 21/207; B60R 2021/0032; B60R 2021/0034; B60R 2021/0046; B60R 2021/0053; B60R 2021/0055; B60R 2021/022; B60R 2021/23176; B60R 2021/23107; B60N 3/066; B60N 2/42763; B60N 2/4214; B60N 2/995
See application file for complete search history.

(56) References Cited

U.S. PATENT DOCUMENTS 4,183,582 A * 1/1980 Taki ..................... B60N 2/4221
                                                            280/802
5,340,185 A * 8/1994 Vollmer ............... B60N 2/4221
                                                            296/68.1
(Continued)

FOREIGN PATENT DOCUMENTS

JP    2005-125944 A    5/2005
JP    2005-319839 A    11/2005
(Continued)

*Primary Examiner* — Laura Freedman
(74) *Attorney, Agent, or Firm* — Posz Law Group, PLC

(57) ABSTRACT

A seat device for a vehicle includes a seat for supporting a lower body of a vehicle occupant, and a backrest for supporting an upper body of the occupant. The seat device further includes an arresting portion that is stored in a storage position disposed in the seat. The arresting portion is configured to be deployed from the storage position and restrain a part of the lower body of the occupant from moving forward in the event of a collision of the vehicle.

4 Claims, 26 Drawing Sheets

(51) Int. Cl.
  *B60N 2/427* (2006.01)
  *B60R 21/00* (2006.01)
(52) U.S. Cl.
  CPC .............. *B60R 2021/0032* (2013.01); *B60R 2021/0046* (2013.01); *B60R 2021/0053* (2013.01)

(56) References Cited

U.S. PATENT DOCUMENTS

| | | | |
|---|---|---|---|
| 6,296,292 B1* | 10/2001 | Feldman | B60N 2/4221 280/728.2 |
| 6,935,684 B2* | 8/2005 | Sakai | B60N 2/4221 297/216.1 |
| 7,306,257 B2* | 12/2007 | Yoshikawa | B60R 21/207 280/728.2 |
| 7,648,161 B2* | 1/2010 | Kai | B60N 2/4221 280/730.2 |
| 7,758,121 B2* | 7/2010 | Browne | B60R 7/043 297/284.11 |
| 8,100,471 B2* | 1/2012 | Lawall | B60N 2/42763 297/216.1 |
| 8,702,121 B2* | 4/2014 | Yamashita | B60R 21/207 280/730.1 |
| 9,126,510 B2* | 9/2015 | Hirako | B60N 2/42763 |
| 9,199,559 B2* | 12/2015 | Wilmot | B60N 2/4242 |
| 9,376,040 B2* | 6/2016 | Fukawatase | B60N 2/4221 |
| 9,428,137 B2* | 8/2016 | Lee | B60R 21/2334 |
| 9,457,751 B1* | 10/2016 | Stancato | B60R 21/02 |
| 9,604,556 B2* | 3/2017 | Fukawatase | B60R 21/207 |
| 9,616,839 B2* | 4/2017 | Khouphongsy | B60N 2/42718 |
| 9,643,521 B2* | 5/2017 | Frommann | B60N 2/42709 |
| 9,738,187 B1* | 8/2017 | McCoy | B60N 2/62 |
| 10,189,432 B2* | 1/2019 | Matsushita | B60R 22/00 |
| 10,710,540 B2* | 7/2020 | Fukawatase | B60N 2/42718 |
| 10,800,368 B2* | 10/2020 | Kitagawa | B60R 21/231 |
| 2006/0017266 A1* | 1/2006 | Yoshikawa | B60R 21/207 280/730.1 |
| 2006/0267325 A1* | 11/2006 | Kumagai | B60N 2/42718 280/753 |
| 2017/0028960 A1* | 2/2017 | Kobayashi | B60R 21/233 |
| 2020/0130632 A1* | 4/2020 | Sekizuka | B60R 21/231 |
| 2020/0391691 A1* | 12/2020 | Fischer | B60R 21/207 |

FOREIGN PATENT DOCUMENTS

| | | | |
|---|---|---|---|
| JP | 2006-006547 A | | 1/2006 |
| JP | 2008302804 A | * | 12/2008 |
| JP | 2009-154812 A | | 7/2009 |
| JP | 2009-190566 A | | 8/2009 |
| JP | 2015-085761 A | | 5/2015 |
| JP | 2019034674 A | * | 3/2019 |
| JP | 2019043482 A | * | 3/2019 |

\* cited by examiner

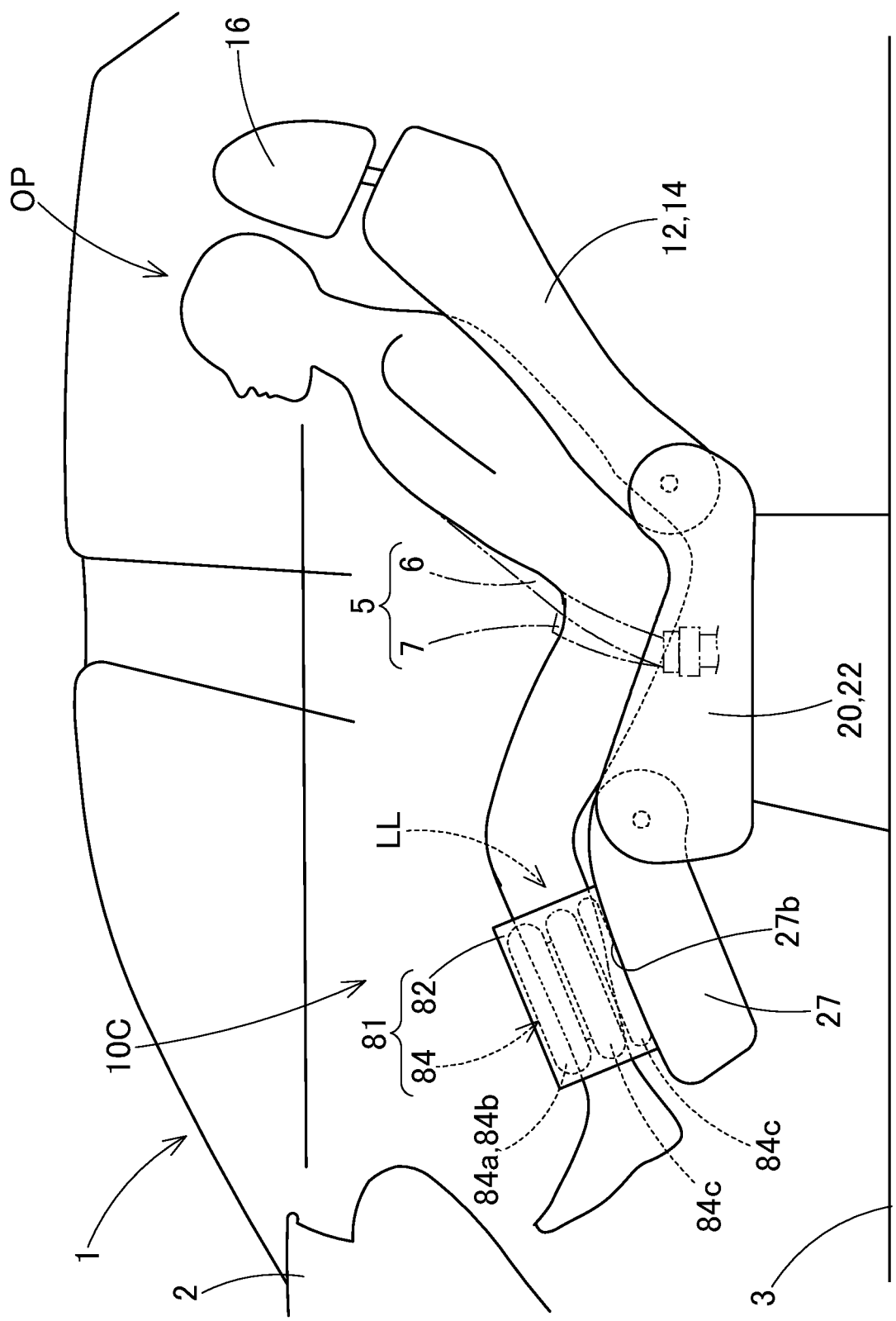

SEAT DEVICE WITH ARRESTING PORTION

CROSS REFERENCE TO RELATED APPLICATIONS

The Present application claims priority from Japanese Patent Application No. 2018-121042 of Masuda et al., filed on Jun. 26, 2018, and Japanese Patent Application No. 2019-065998 of Masuda et al., filed on Mar. 29, 2019, the entire disclosures of which are incorporated herein by reference.

BACKGROUND OF THE INVENTION

1. Field of the Invention

The present invention relates to a seat device for a vehicle which is actuated in the event of a collision and restrains a lower body of a vehicle occupant sitting in the seat from moving forward.

2. Description of Related Art

JP 2009-154812 A discloses a known seat device for a vehicle that has a backrest and a seat for supporting an upper body and a lower body of an occupant. The seat device includes, inside the backrest, a bag body which protrudes from the backrest and arrests the thorax and head of the occupant in the event of a collision of the vehicle. Another known seat device disclosed in JP 2005-125944 A includes an airbag in an armrest coupled to the backrest. The airbag protrudes from the armrest and arrests the upper body of an occupant in the event of a collision. Furthermore, J P 2015-85761 A discloses, in paragraphs 0073 to 0076 and in FIGS. 20 and 21, a seat device which includes an airbag stored at the center in a left and right direction of the front surface of the seat. The airbag protrudes therefrom forward upon a collision of the vehicle in order to prevent left and right shanks of the occupant from coming close to each other, and prevent a sprain of his ankle(s) in cooperation with a knee-protecting airbag which protrudes rearward from the vehicle body.

However, even the seat devices disclosed in the above-mentioned prior art would not sufficiently prevent a so-called "submarining" which is a phenomenon that a vehicle occupant slides out from under the seat belt in the event of a frontal collision, especially when he sits in a seat as reclining at an angle of approximately 40 to 50 degrees with respect to a horizontal direction, i.e. when he sits in a reclining posture.

SUMMARY OF THE INVENTION

An object of the present invention is to provide a seat device that is able to adequately protect a vehicle occupant sitting in a reclining posture in the event of a collision of a vehicle.

The seat device of the invention is adapted to be mounted on a vehicle, and includes a seat for supporting a lower body of a vehicle occupant, and a backrest for supporting an upper body of the occupant. The seat device further includes an arresting portion that is stored in a storage position disposed in the seat, and that is configured to be deployed from the storage position and restrain a part of the lower body of the occupant from moving forward in the event of a collision of the vehicle.

If an impact is applied to the vehicle equipped with the seat device of invention, the arresting portion is deployed from the storage position in the seat and restrains the lower body of the occupant from moving forward. That is, by arresting the lower body of the occupant, the arresting portion prevents the occupant from submarining, i.e. from sliding out from under the seatbelt and going down the seat forward, thus protecting the occupant adequately. Especially, since the arresting portion arrests the lower body of the occupant, not the upper body, a submarining will be adequately prevented even if a collision occurs when the occupant sits in a reclining posture. Moreover, unlike a knee-protecting airbag device which is usually mounted on a front part of the vehicle body in front of the seat, the arresting portion of the invention is mounted on the seat of the seat device. With this configuration, even if the seat device is located far apart from the front part of the vehicle body, the arresting portion is able to restrain the occupant adequately.

Therefore, the seat device of the invention is able to protect a vehicle occupant sitting in a reclining posture adequately in the event of a collision of the vehicle.

The arresting portion can be configured as a pelvis arresting portion stored in at least one side of the seat, so as to be deployed therefrom in front of a pelvic region of an occupant.

With this configuration, by restraining the pelvic region of the occupant from moving forward, the pelvis arresting portion is able to prevent him from submarining, i.e. from sliding out from under the seatbelt and going down the seat forward, thus protecting the occupant adequately. Such a pelvis arresting portion is also able to arrest an occupant sitting in a normal upright posture and protect him from submarining.

The seat device of the invention may also be configured such that the seat is provided with a legrest in front thereof, and that the arresting portion is stored in the legrest so as to be deployed therefrom, in front of lower legs of the occupant.

With this configuration, the arresting portion serves as a leg arresting portion. When actuated, the leg arresting portion is able to restrain the lower legs of the occupant from moving forward, and protect him from submarining, i.e. from sliding out from under the seatbelt and going down the seat forward. Such a leg arresting portion is also able to arrest an occupant sitting in a normal upright posture and protect him from submarining.

In the above instance, the leg arresting portion may be disposed in at least one side of the legrest so as to be deployed therefrom in front of the lower legs, or may be disposed at a central portion in a left and right direction of a surface region of the legrest so as to be deployed therefrom in front of the lower legs.

Moreover, the seat device of the invention may be configured such that the seat is provided with a pair of armrests on left and right sides thereof, and that the arresting portion is stored in at least one of the armrests so as to be deployed therefrom on thighs of the occupant.

With this configuration, the arresting portion serves as a thigh arresting portion. When actuated, the thigh arresting portion deploys from the storage position in the armrest and restrains the thighs of the occupant from moving forward, thus protecting him from submarining, i.e. from going down the seat forward.

The seat device of the invention may also be configured such that the seat includes a table that is provided with a top board and a pair of legs extending from left and right sides of the top board towards left and right edges of the seat, and that the arresting portion is stored in an underside of the top board of the table so as to be deployed therefrom on thighs of the occupant.

This thigh arresting portion, when actuated, deploys from the storage position in the underside of the top board of the table and restrains the thighs of the occupant from moving forward, thus protecting him from submarining, i.e. from going down the seat forward.

Each of the arresting portions described above may be composed of an airbag that is stored in the storage position in a folded configuration so as to unfold and be inflated with an inflation gas fed from a gas source, or may be configured to have shape retention enough for arresting the lower body and be deployed from the storage position by operation of a mechanical deployment apparatus.

When the seat is provided with a legrest in front thereof, the arresting portion may be stored on a surface of the legrest so as to be deployed in such a manner as to sandwich and hold each of lower legs of the occupant from left and right sides.

With this configuration, the arresting portion serves as a leg arresting portion which sandwiches and holds each of the lower legs and protects the lower legs from submarining adequately.

The seat device of the invention may also include a lifting apparatus that is disposed in the seat and lifts a front portion of a most sunken region of the seat for restraining buttocks of the occupant from moving forward.

The arresting portion will be able to prevent submarining of the occupant further surely in cooperation with the lifting apparatus.

Furthermore, the arresting portion of the invention can be configured as a foot arresting portion that is deployed in front of soles of an occupant in the event of a collision.

The foot arresting portion as deployed restrains the feet of the occupant sitting in a reclining posture from moving forward and protects him from submarining.

It is desired that the foot arresting portion is stored in a legrest disposed in front of the seat. If the foot arresting portion is stored in the legrest located proximate to the feet of the occupant, the foot arresting portion is able to be deployed in front of the feet quickly.

The foot arresting portion may be composed of an airbag that is stored in the storage position in a folded configuration so as to unfold and be inflated with an inflation gas fed from a gas source, or may be configured to have shape retention enough for arresting the soles and be deployed from the storage position by operation of a mechanical deployment apparatus.

BRIEF DESCRIPTION OF DRAWINGS

FIG. 18 is a schematic side view of a seat device according to a fourth embodiment of the invention;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
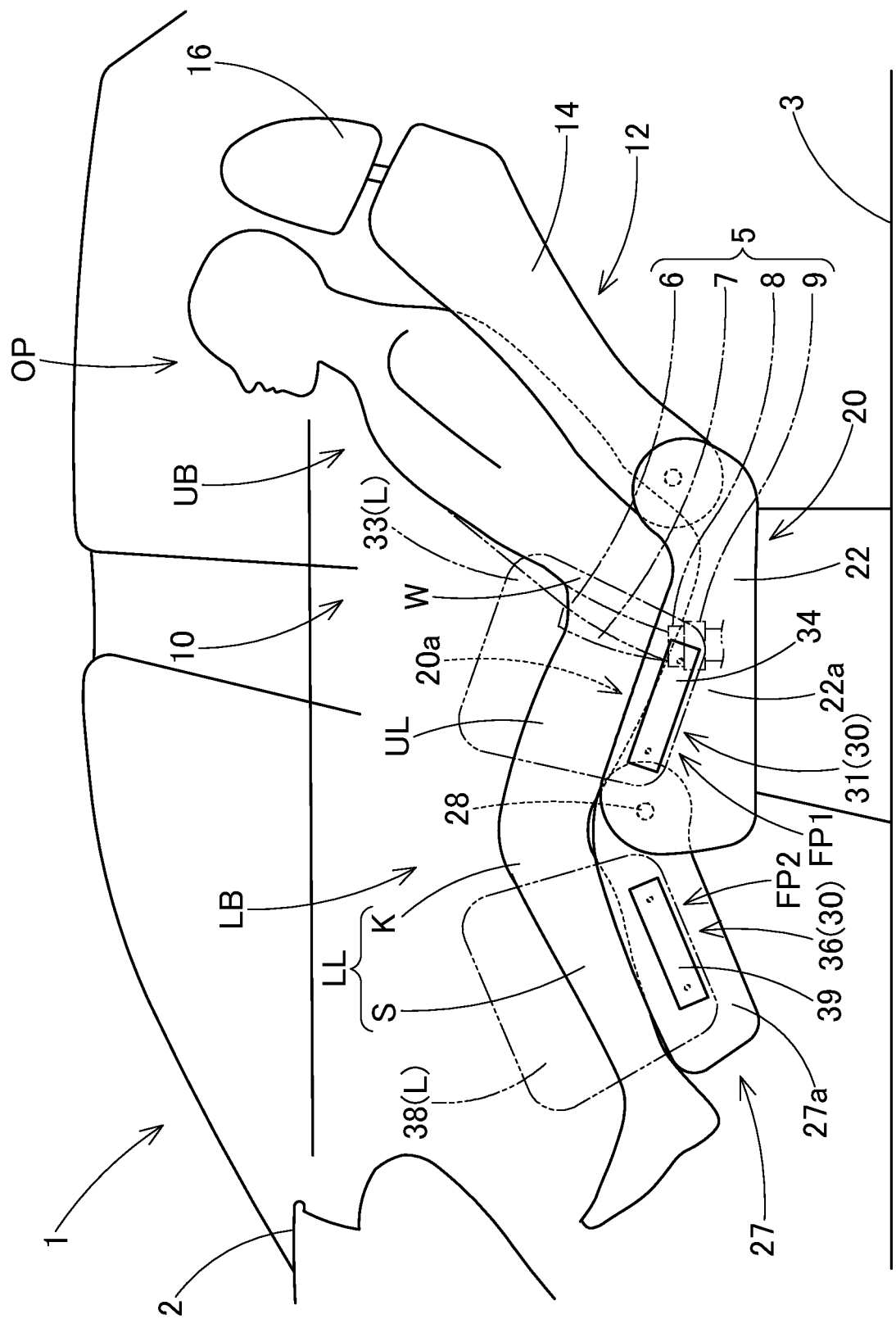
FIG. 1 is a schematic side view of a seat device according to a first embodiment of the invention.
Figure 2:
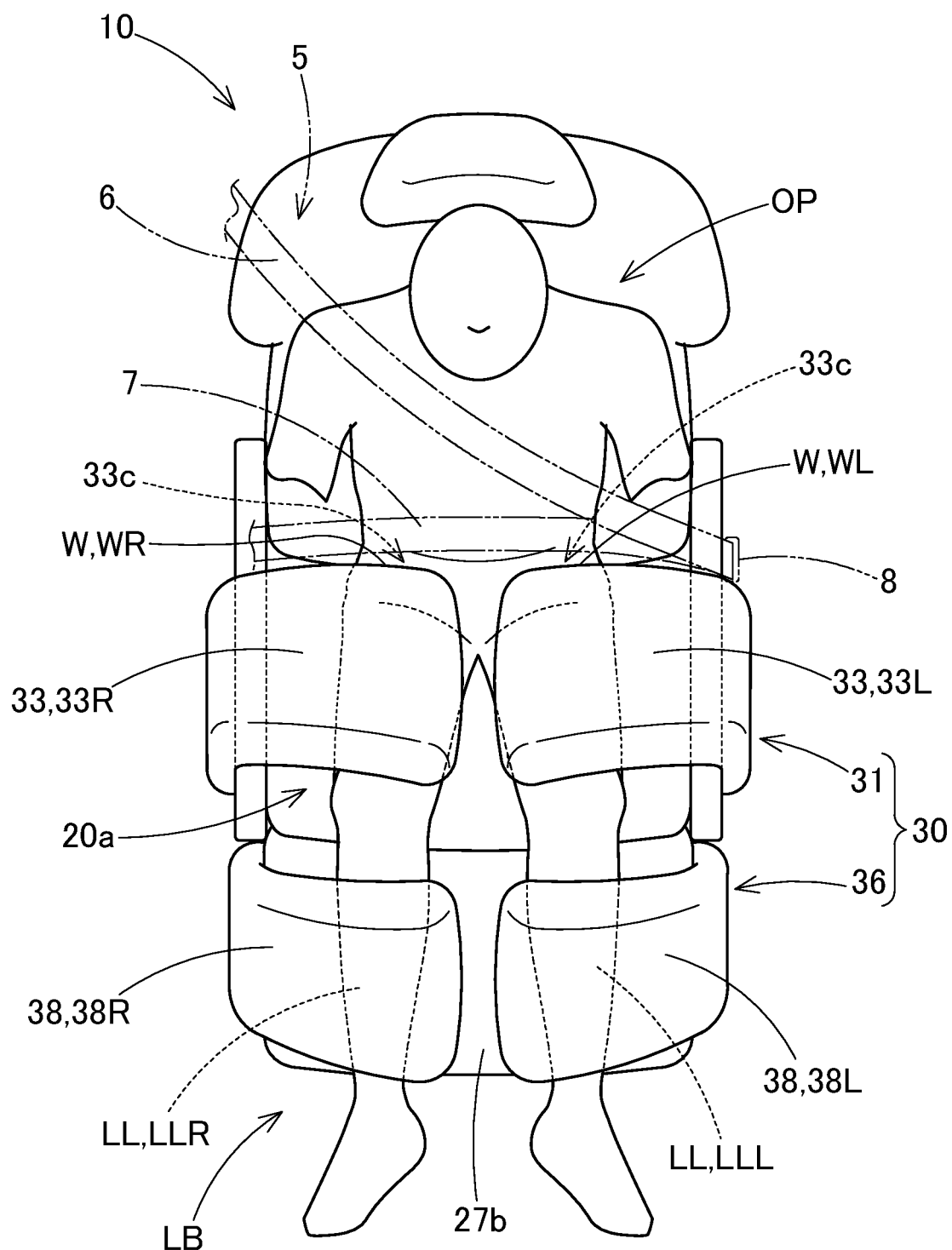
FIG. 2 is a schematic plan view of the seat device of the first embodiment as actuated.
Figure 5:
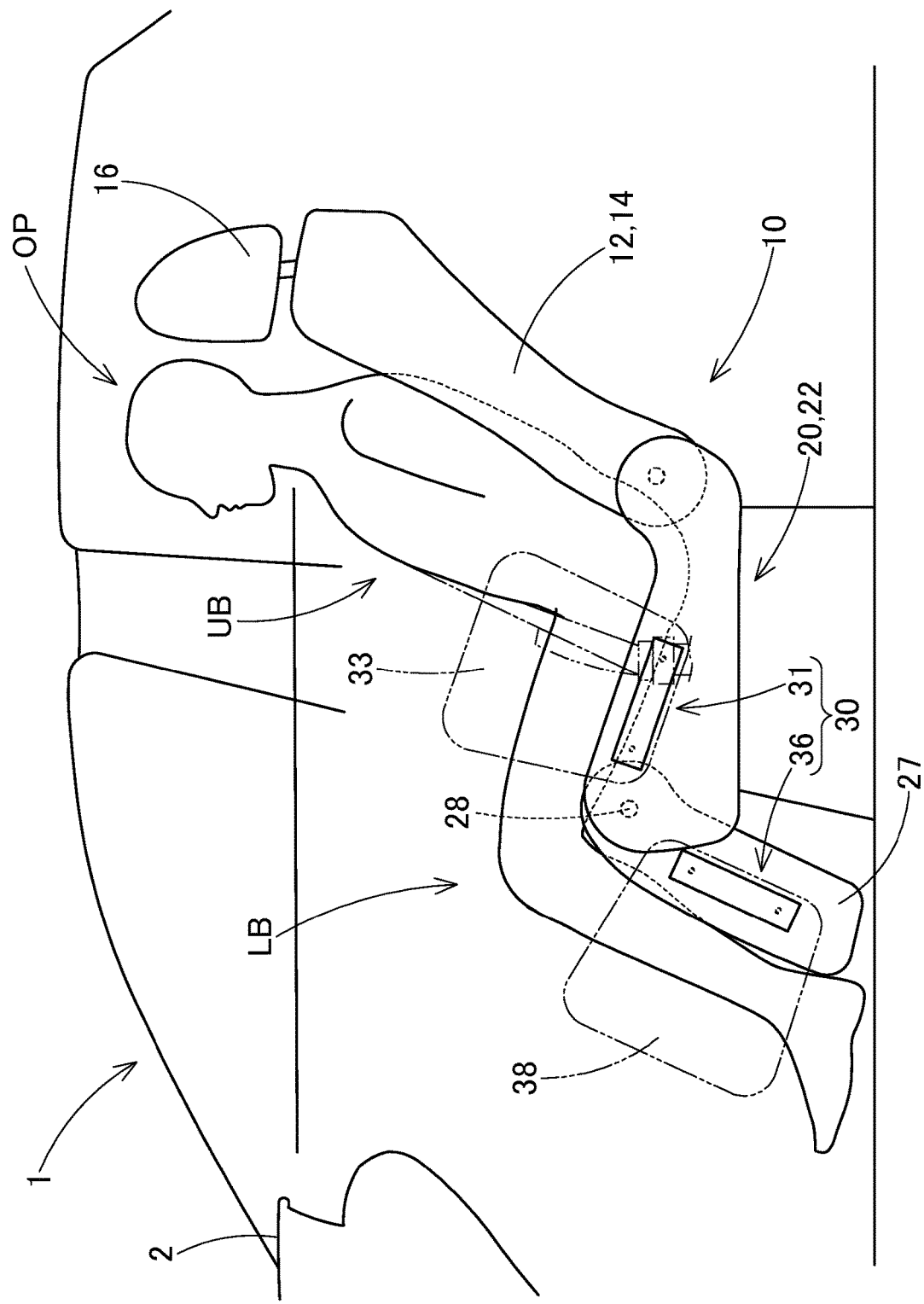
FIG. 5 is a schematic side view of the seat device of the first embodiment as an occupant sits in a normal posture.

A seat device 10 according to a first embodiment of the invention is mounted on a floor 3 of a vehicle 1, at the rear of an instrument panel (or dashboard) 2, as shown in FIGS. 1 and 2. The seat device 10 includes a backrest 12 and a seat 20 for supporting an upper body UB and a lower body LB of a vehicle occupant OP. The backrest 12 includes a headrest 16 on the top of the main body 14. The backrest 12 is adjustable in position or inclination with respect to the seat 20, from an upright position as shown in FIG. 5 to a reclining position as shown in FIG. 1. An occupant OP sitting at an inclination of FIG. 5 is in a normal sitting posture, and an occupant OP sitting at an inclination of FIG. 1 is in a reclining posture. The occupant OP normally fastens a seatbelt 5 regardless of his posture. The seatbelt 5 includes a tongue plate 8 for connection with a buckle 9, a shoulder belt portion 6 and a lap belt portion 7. The shoulder belt portion 6 extends from the tongue plate 8 and is disposed in front of the upper body UB, and the lap belt portion 7 extends from the tongue plate 8 and is disposed in front of the pelvic region W.

The seat 20 includes a main body 22 and a legrest 27 which extends downward from the main body 22. The legrest 27 is rotatably supported by a shaft 28 which is disposed in a front end portion of the main body 22 so as to be tiltable with respect to the main body 22. By way of example, the legrest 27 can be disposed generally horizontally as shown in FIG. 1 or generally vertically as shown in FIG. 5. In other words, the legrest 27 supports lower legs LL including knees K and shanks S in a reclining posture shown in FIG. 1, and is disposed at the back of the lower legs LL in a normal sitting posture.

The seat device 10 of the first embodiment of the invention includes, as an arresting portion that is deployed from a storage disposed in the seat 20 and arrests a part of the lower body LB of an occupant, airbags or pelvis arresting portions 33 (33L, 33R) for arresting the pelvic region W of the occupant OP, and airbags or leg arresting portions 38 (38L, 38R) for arresting the lower legs LL of the occupant OP. That is, the seat device 10 of the first embodiment includes an occupant arresting device 30 which includes two kinds of arresting devices; a pelvis arresting device 31 provided with the airbags (i.e. pelvis arresting portions) 33 (33L, 33R) and a leg arresting device 36 provided with the airbags (i.e. leg arresting portions) 38 (38L, 38R).

The pelvis arresting device 31 and leg arresting device 36 of the occupant arresting device 30 are configured to be actuated in response to an actuating signal fed from a not-shown control as has detected such a collision that would cause a forward movement of the occupant, based on a signal fed from a collision sensor mounted on a front bumper or the like of the vehicle 1.

Figure 3:
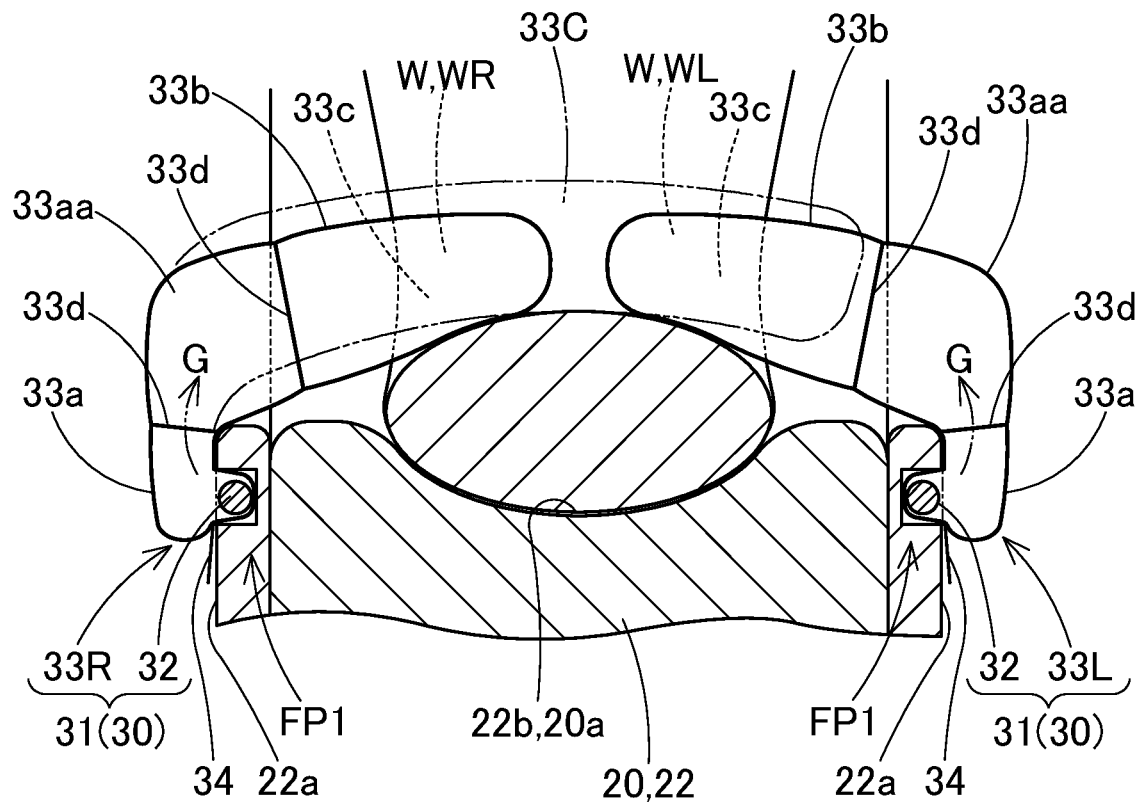
FIG. 3 is a schematic vertical sectional view of the seat device of the first embodiment as actuated, taken along a left and right direction at a pelvis arresting device.

As shown in FIGS. 1 to 3, the pelvis arresting device 31 is stored at two storage positions FP1 which are located in left and right sides 22a of the main body 22 of the seat 20, and includes, in each of the left and right sides, the airbag (i.e. pelvis arresting portion) 33 (33L, 33R), which is stored in a folded configuration, and an inflator (as a gas source) 32 for feeding the airbag 33 with an inflation gas G. Each of the airbags 33 (33L, 33R) includes a base portion 33a which houses the inflator 32 and is secured to the storage position FP1 in the seat main body 22, and an arresting body 33b which restrains the pelvic region W. The airbag 33 is designed to be deployed, when fed with an inflation gas G, such that the base portion 33a protrudes outwardly in a left and right direction from the storage position FP1 (i.e. from each of the left and right sides 22a of the main body 22 of the seat 20) and extends upwardly, and the arresting body 33b extends from the upper end 33aa of the base portion 33a towards the center in a left and right direction of the main body 22 of the seat 20 above the seat 20 in the shape of a generally rectangular parallelepiped. Furthermore, the airbag 33 (33L, 33R) is designed to be so deployed that the rear surface 33c is disposed in proximity to the front surface of left/right sides of the pelvic region W of the occupant OP. The rear surface 33c of each of the airbags 33L and 33R serves as an arresting plane that restrains the pelvic region W from moving forward. The airbag 33 (33L, 33R) internally includes a plurality of tethers 33d each of which connects an inner wall and an outer wall of the airbag 33, as shown in FIG. 3. The bent deployed contour of the airbag 33 which bends between the base portion 33a and arresting body 33b can be easily made by making a distance between the joints of the tethers 33d to the outer wall greater than a distance between the joints of the tethers 33d to the inner wall.

Figure 4:
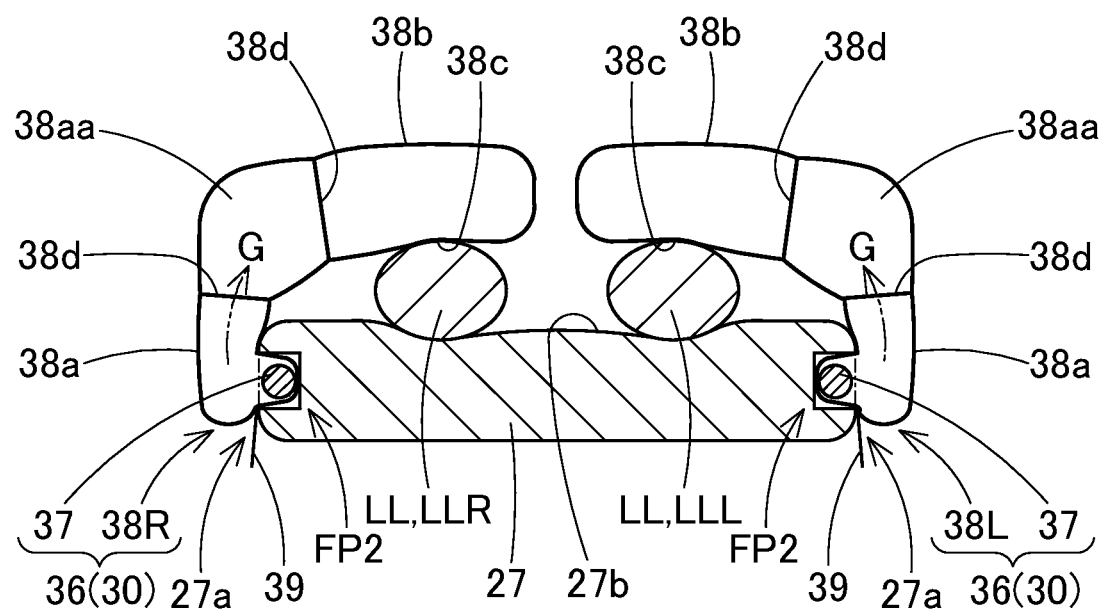
FIG. 4 is a schematic vertical sectional view of the seat device of the first embodiment as actuated, taken along a left and right direction at a leg arresting device.

As shown in FIGS. 1, 2 and 4, the leg arresting device 36 is stored at two storage positions FP2 which are located in left and right sides 27a of the legrest 27, and includes, in each of the left and right sides, the airbag (i.e. leg arresting portion) 38 (38L, 38R), which is stored in a folded configuration, and an inflator (as a gas source) 37 for feeding the airbag 38 with an inflation gas G. Each of the airbags 38 (38L, 38R) includes a base portion 38a which houses the inflator 37 and is secured to the storage position FP2 in the legrest 27 and an arresting body 38b which restrains the lower leg LL. The airbag 38 is designed to be deployed, when fed with an inflation gas G, such that the base portion 38a protrudes outwardly in a left and right direction from the storage position FP2 (i.e. from each of the left and right sides 27a of the legrest 27) and extends upwardly, and the arresting body 38b extends from the upper end 38aa of the base portion 38a towards the center in a left and right direction of the legrest 27 above the legrest 27 in the shape of a generally rectangular board. Furthermore, the airbag 38 (38L, 38R) is designed to be so deployed that the lower surface 38c is disposed in front of (more specifically, at an obliquely above and in front of) the lower leg LL of the occupant OP. The lower surface 38c of each of the airbags 38L and 38R serves as an arresting plane that restrains the lower leg LL from moving forward. The airbag 38 (38L, 38R) internally includes a plurality of tethers 38d each of which connects an inner wall and an outer wall of the airbag 38, as shown in FIG. 4. The bent deployed contour of the airbag 38 which bends between the base portion 38a and arresting body 38b can be easily made by making a distance between the joints of the tethers 38d to the outer wall greater than a distance between the joints of the tethers 38d to the inner wall.

If an impact is applied to a front portion of the vehicle 1 equipped with the seat device 10 of the first embodiment, the not-shown control device actuates the inflators 32 and 37 of the occupant arresting device 30 (i.e. the pelvis arresting device 31 and leg arresting device 36), and the inflators 32 and 37 feed the arresting portions (i.e. the airbags 33L, 33R, 38L and 38R) of the occupant arresting device 30 with inflation gases and inflate them. The airbags 33 and 38 then push open covers 34 and 39 which had covered the airbags, emerge from the storage positions FP1 and FP2 in the seat 20, and are deployed in front of the lower body LB (specifically, in front of the pelvic region W and lower legs LL)

of the occupant OP and restrain the lower body LB (i.e. the pelvic region W and lower legs LL) from moving farther forward. That is, by arresting the lower body LB (i.e. the pelvic region W and lower legs LL) of the occupant OP with the arresting portions (i.e. the airbags 33L, 33R, 38L and 38R), the occupant arresting device 30 prevents the occupant OP from submarining, i.e. from sliding out from under the seatbelt 5 and going down the upper surface 20a of the seat 20, thus protecting the occupant OP adequately. Especially, since the airbags (arresting portions) 33 and 38 arrest the lower body LB of the occupant OP, not the upper body UB, a submarining will be adequately prevented even if a collision occurs when the occupant OP sits in a reclining posture as shown in FIGS. 1 and 2. Of course, the airbags (arresting portions) 33 and 38 are adequately deployed in front of the lower body LB (i.e. the pelvic region W and lower legs LL) of the occupant OP, restrain the lower body LB from moving forward, as indicated with double-dotted lines in FIG. 5, also when he sits in a normal upright posture as shown in FIG. 5. Thus a submarining is prevented adequately. Moreover, unlike a knee-protecting airbag device which is usually mounted on a front part of the vehicle body in front of a seat, the airbags (arresting portions) 33 and 38 are mounted on the seat 20 of the seat device 10. Accordingly, even if the seat device 10 is located far apart from the front part of the vehicle body, the airbags 33 and 38 are able to restrain the occupant OP adequately.

Therefore, the seat device 10 of the illustrated embodiment is able to protect the occupant OP in the event of a collision of the vehicle 1 adequately, not only when he sits in a normal posture but also when he sits in a reclining posture.

In the seat device 10 of the first embodiment of the invention, the airbags 33 (33L, 33R) of the pelvis arresting device 31 serve as the pelvis arresting portion that arrest the pelvic region W of the occupant OP. The storage positions FP1 of the airbags 33 are disposed in the left and right sides 22a of the seat 20, such that the airbags 33 are deployed from the storage positions FP1 and disposed in front of the pelvic region W of the occupant OP, more particularly, such that the airbag 33L is deployed in front of a left region WL of the pelvic region W while the airbag 33R in front of a right region WR of the pelvic region W, as indicated with double-dotted lines in FIG. 1 and solid lines in FIGS. 2 and 3.

With this configuration, by restraining the pelvic region W of the occupant OP from moving forward, the airbags 33L and 33R as the pelvis arresting portion are able to prevent the occupant OP from submarining, i.e. from sliding out from under the seatbelt 5 and going down the seat 20 forward, thus protecting the occupant OP adequately.

The pelvis arresting device 31 includes two airbags 33L and 33R that are stored in both of the left and right sides 22a of the seat 20 for arresting the pelvic region W in cooperation. Alternatively, as indicated with double-dotted lines in FIG. 3, the pelvis arresting portion may be composed of such an airbag 33C that is stored in one storage position FP1 disposed in a left or right side of the seat 20 so as to be deployed in front of the left and right regions WL and WR of the pelvic region W.

In the seat device 10 of the first embodiment of the invention, moreover, the airbags 38 (38L, 38R) of the leg arresting device 36 serve as the leg arresting portions that arrest the lower legs LL of the occupant OP. The storage positions FP2 of the airbags 38 are disposed in the legrest 27 which is located in front of the seat 20, such that the airbags 38 are respectively deployed from the storage positions FP2 and disposed in front of the lower legs LL of the occupant OP, more particularly, such that the airbag 38L is deployed in front of a left lower leg LLL while the airbag 38R in front of a right lower leg LLR, as indicated with double-dotted lines in FIG. 1 and solid lines in FIGS. 2 and 4.

With this configuration, by restraining the lower legs LL of the occupant OP from moving forward, the airbags 38L and 38R as the leg arresting portions are able to prevent the occupant OP from submarining, i.e. from sliding out from under the seatbelt 5 and going down the seat 20 forward, thus protecting the occupant OP adequately.

Figure 6:
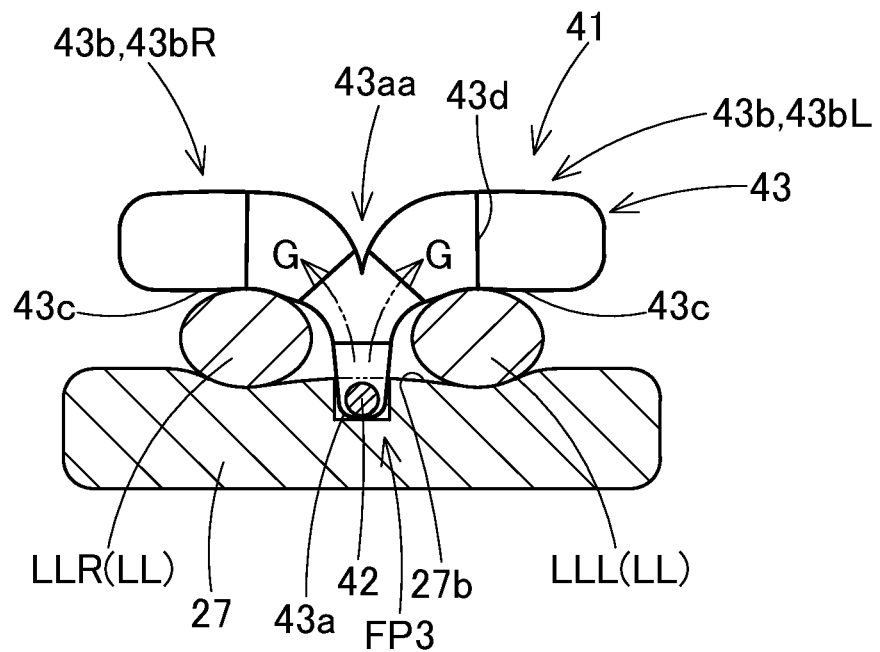
FIG. 6 is a schematic vertical sectional view of a modification of the leg arresting device of the first embodiment.

The leg arresting device 36 includes two airbags 38L and 38R that are stored in the left and right sides 27a of the legrest 27 and arrest the left lower leg LLL and right lower leg LLR respectively. Alternatively, the leg arresting device may be configured like a leg arresting device 41 depicted in FIG. 6. An airbag or leg arresting portion 43 of the leg arresting device 41 is stored in a storage position FP3 which is disposed at a central portion in a left and right direction of a surface region 27b of the legrest 27, and the airbag 43 is designed to be deployed, from the storage position FP3, in front of the lower legs LL of the occupant OP.

More specifically, the leg arresting device 41 includes, in the storage position FP3 disposed at the central portion in the left and right direction of the surface region 27b of the legrest 27, the airbag 43 as the leg arresting portion, and an inflator 42 as a gas source for feeding the airbag 43 with an inflation gas G. The airbag 43 includes a base portion 43a which houses the inflator 42 and is secured to the storage position FP3 and an arresting body 43b which restrains the lower legs LL. The airbag 43 is designed to be deployed such that the base portion 43a protrudes upward from the storage position FP3, the arresting body 43b bifurcates from an upper end 43aa of the base portion 43a into a left portion 43bL and a right portion 43bR, and the left portion 43bL and right portion 43bR are each deployed in front of (more specifically, at an obliquely above and in front of) the left lower leg LLL and right lower leg LLR. Lower surfaces 43c of the left portion 43bL and right portion 43bR of the arresting body 43b serve as arresting planes that restrain the lower legs LL from moving forward. The bent deployed contour of the airbag 43 can be formed by adjusting locations of joints of tethers 43d to inner and outer walls of the airbag 43, in a similar fashion to the airbags 33 and 38.

When the leg arresting device 41 is actuated, the airbag 43 as the leg arresting portion is deployed from the storage position FP3 disposed in the central portion in the left and right direction of the legrest 27 such that the left portion 43bL and right portion 43bR of the arresting body 43b are each deployed in front of the left lower leg LLL and right lower leg LLR of the occupant OP, and restrain the left lower leg LLL and right lower leg LLR from moving forward by the lower surfaces (i.e. arresting planes) 43c. Therefore, the airbag 43 is able to prevent the occupant OP from submarining, i.e. from sliding out from under the seatbelt 5 and going down the seat 20, thus protecting the occupant OP adequately.

Figure 7:
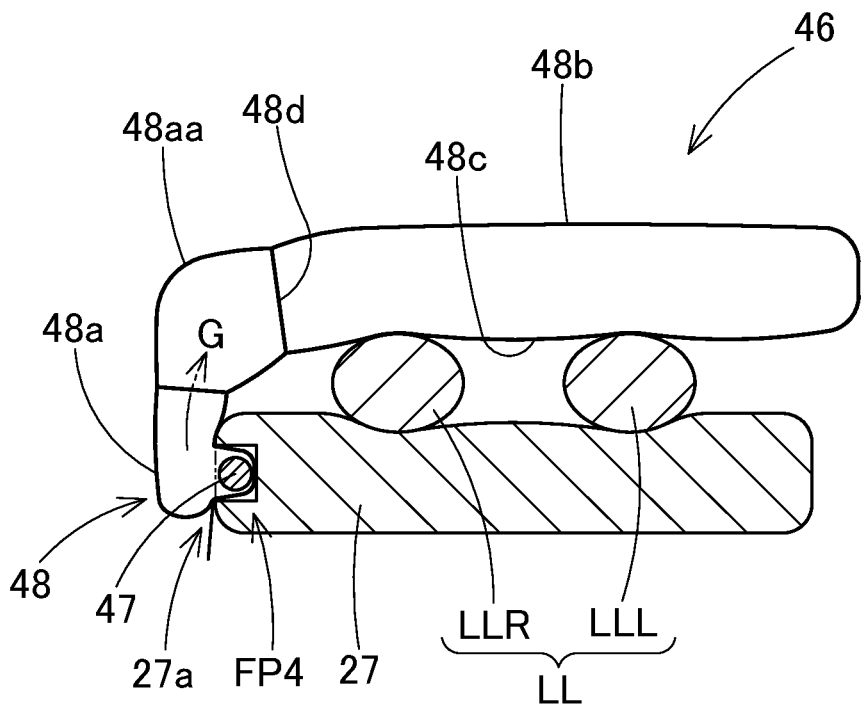
FIG. 7 is a schematic vertical sectional view of another modification of the leg arresting device of the first embodiment.

The leg arresting device may be configured as depicted in FIG. 7. A leg arresting device 46 is stored in a storage position FP4 which is disposed in one side 27a of the legrest 27, and includes an airbag 48 and an inflator (gas source) 47. The airbag 48 is designed to be so deployed that a base portion 48a secured to the storage position FP4 protrudes outwardly in a left and right direction and extends upward, and an arresting body 48b extends from the upper end 48aa of the base portion 48a and covers front sides of the left lower leg LLL and right lower leg LLR. The lower surface 48c of the airbag 48 serves as an arresting plane that restrains the lower legs LL from moving forward. Thus the airbag (i.e. leg arresting portion) 48 prevents the occupant OP from submarining, i.e. from sliding out from under the seatbelt 5 and going down the seat 20, and protects the occupant OP adequately. The bent deployed contour of the airbag 48 is formed by adjusting locations of joints of tethers 48d to inner and outer walls of the airbag 48, in a similar fashion to the airbags 33 and 38.

Figure 8:
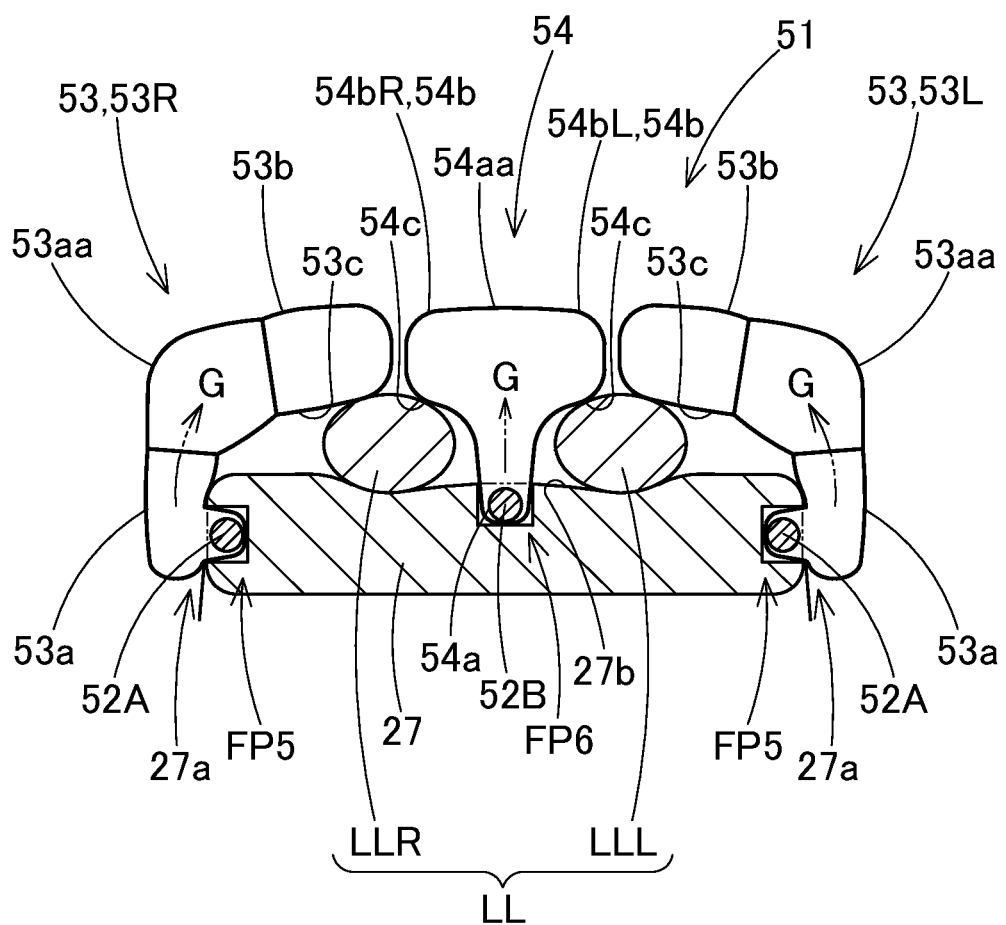
FIG. 8 is a schematic vertical sectional view of yet another modification of the leg arresting device of the first embodiment.

Further alternatively, the leg arresting device can be composed of a pair of airbags (leg arresting portions) 53 (53L, 53R) deployed from the left and right sides 27a of the legrest 27 and an airbag (leg arresting portion) 54 deployed from the center in a left and right direction of the surface region 27b of the legrest 27 such that the airbags 53 and 54 restrain the lower legs LL from moving forward in cooperation, like a leg arresting device 51 depicted in FIG. 8. In the leg arresting device 51, the airbags 53L and 53R are stored in storage positions FP5 which are disposed in left and right sides 27a of the legrest 27 each together with an inflator (gas source) 52A for feeding the airbag 53 with an inflation gas G, and the airbag 54 is stored in a storage position FP6 which is disposed in the central portion in the left and right direction of the legrest 27, together with an inflator 52B for feeding the airbag 54 with an inflation gas G. At deployment, in each of the airbags 53L and 53R, a base portion 53a protrudes outwardly in a left and right direction from the storage position FP5 and extends upwardly, an arresting body 53b extends from the upper end 53aa of the base portion 53a towards the center in the left and right direction of the legrest 27 above the legrest 27, and is disposed in front of the lower leg LLL, LLR. In the meantime, in the airbag 54, a base portion 54a protrudes upward from the storage position FP6, an arresting body 54b extends towards the left and right from the upper end 54aa of the base portion 54a, and a left portion 54bL and a right portion 54bR of the arresting body 54b are disposed in front of the left lower leg LLL and right lower leg LLR. A lower surface 53c of the arresting body 53b of the airbag 53L and a lower surface 54c of the arresting body 54b of the airbag 54 serve as arresting planes that restrain the left lower leg LLL, while a lower surface 53c of the arresting body 53b of the airbag 53R and the lower surface 54c of the arresting body 54b of the airbag 54 serve as arresting planes that restrain the right lower leg LLR. That is, the leg arresting portions (the airbags 53 and 54) restrain the lower legs LL from moving forward and prevent the occupant OP from submarining, i.e. from sliding out from under the seatbelt 5 and going down the seat 20, thus protecting the occupant OP adequately.

Figure 9:
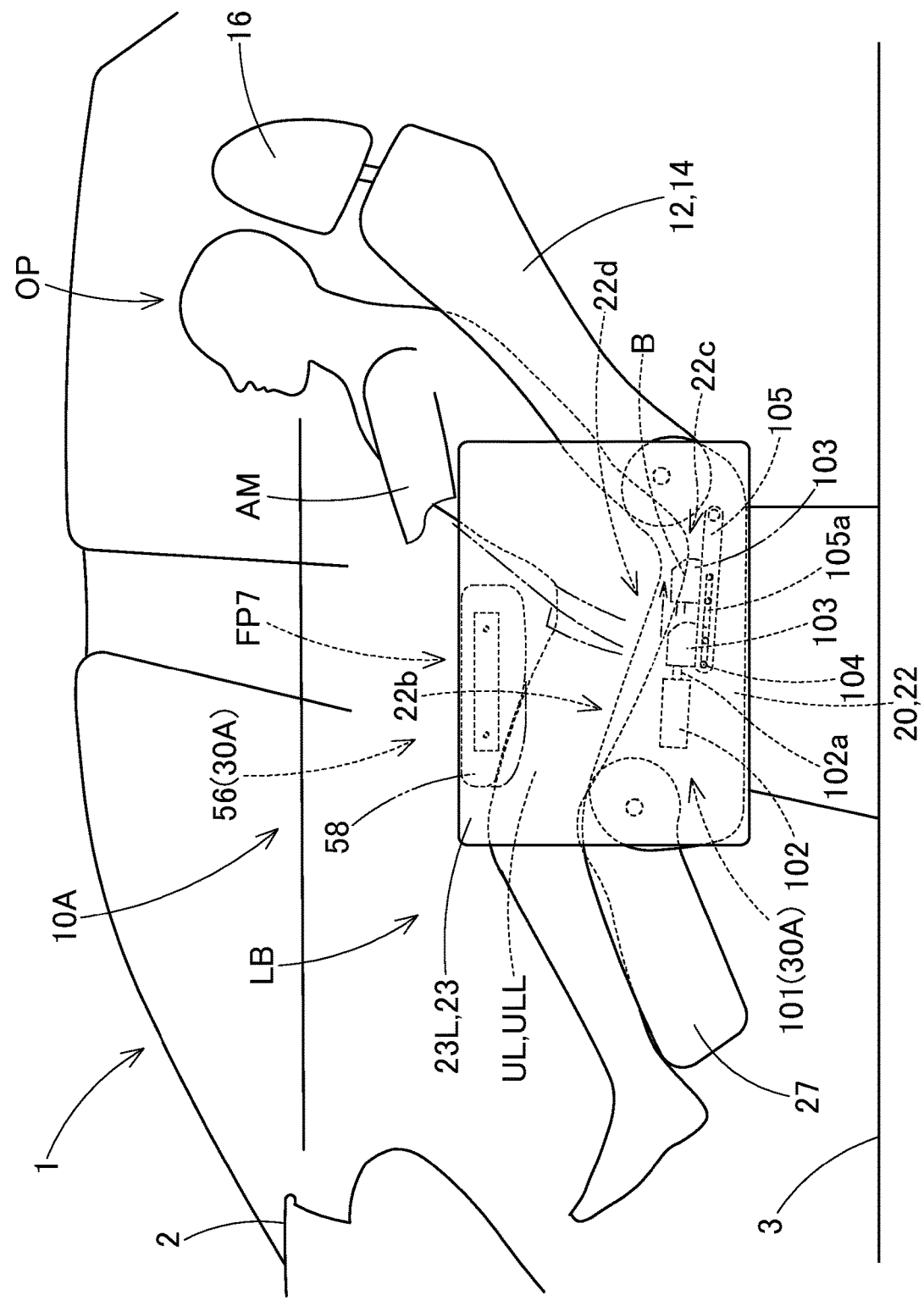
FIG. 9 is a schematic side view of a seat device according to a second embodiment of the invention.
Figure 10:
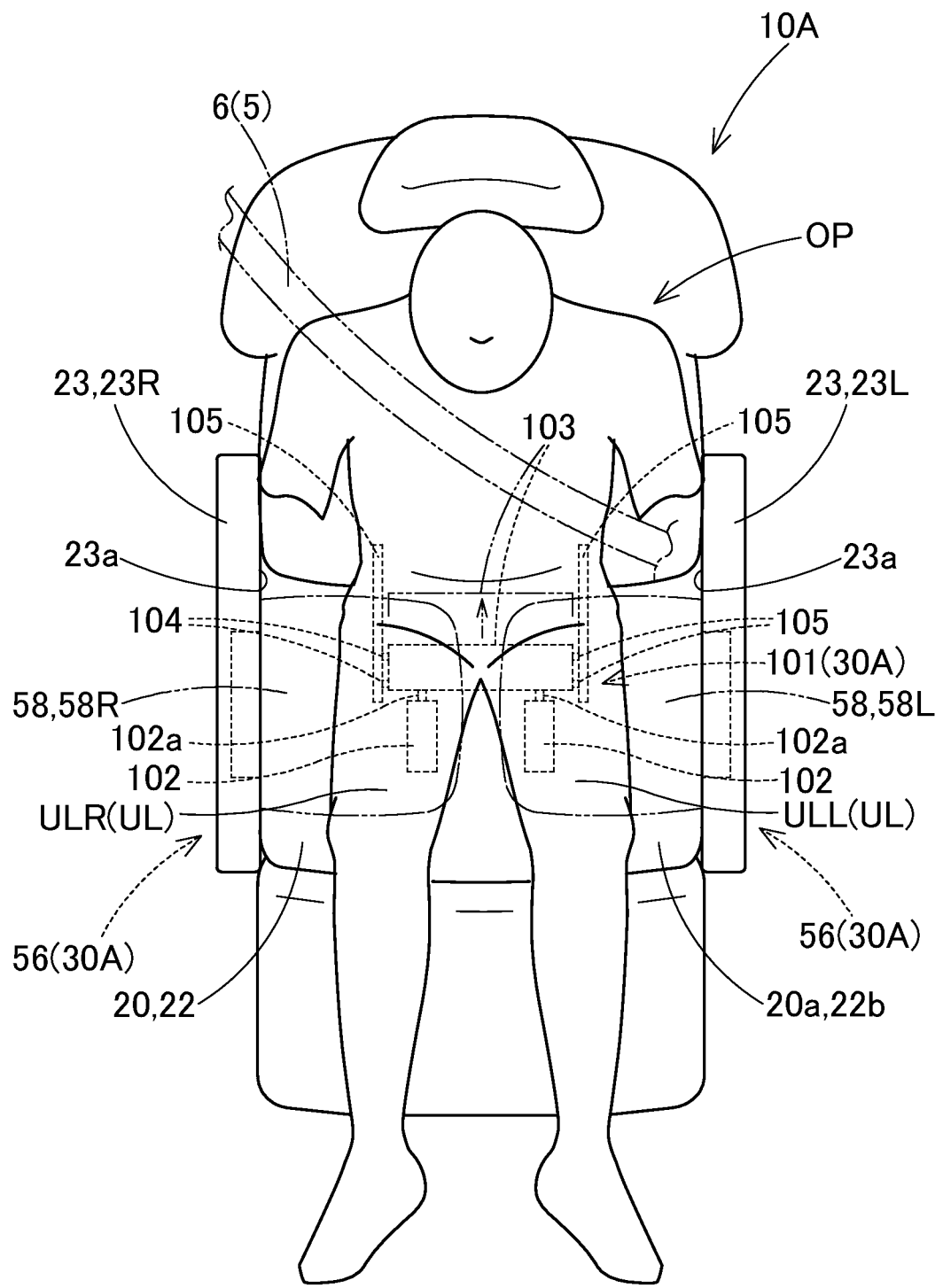
FIG. 10 is a schematic plan view of the seat device of the second embodiment.
Figure 11:
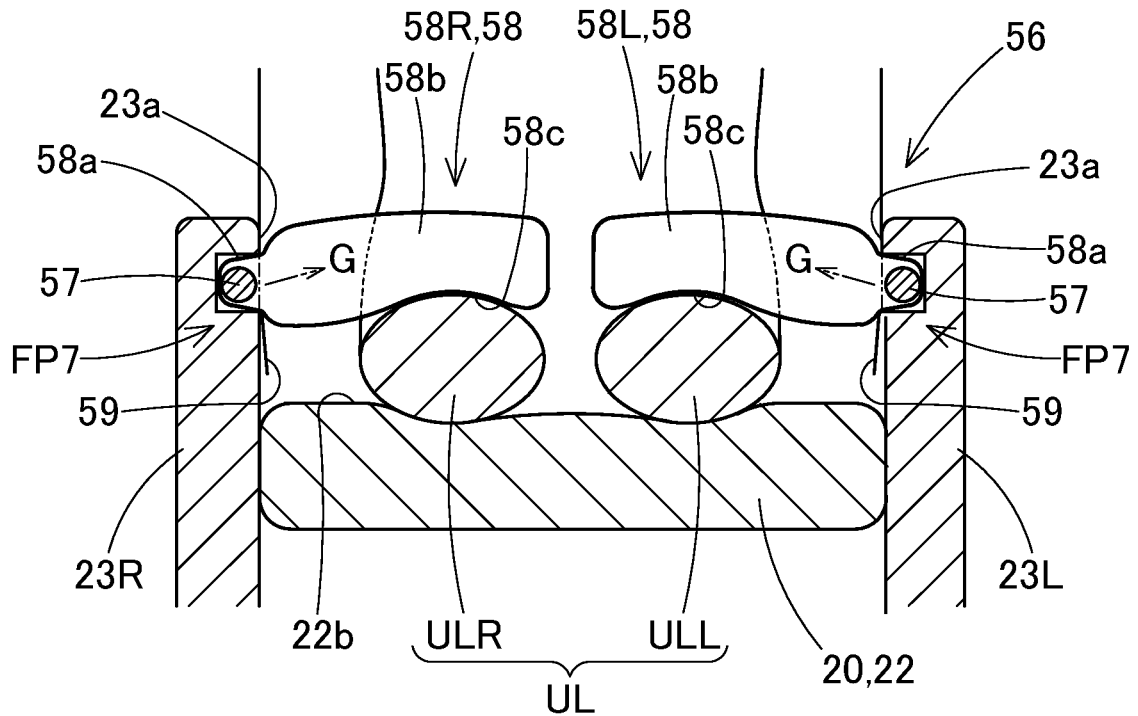
FIG. 11 is a schematic vertical sectional view of the seat device of the second embodiment as actuated, taken along a left and right direction at a thigh arresting device.

A second embodiment of the invention is now described referring to FIGS. 9 to 11. In a similar fashion to the first embodiment, a seat device 10A in the second embodiment includes a backrest 12 and a seat 20. The backrest 12 includes a headrest 16 on the top of the main body 14, and the seat 20 includes a main body 22 and a legrest 27 which is disposed in front of the main body 22. The seat 20 further includes a pair of armrests 23 (23L, 23R) on the left and right sides of the main body 22. The seat device 10A includes an occupant arresting device 30A that includes a thigh arresting device 56 and a lifting apparatus 101.

The thigh arresting device 56 includes a storage position FP7 in each of sides 23a of the left and right armrests 23L and 23R facing towards the seat 20, an airbag 58 (58L, 58R) as a thigh arresting portion and an inflator 57 as a gas source which are stored in each of the storage positions FP7. Each of the airbags 58 (58L, 58R) includes a base portion 58a which houses the inflator 57 and is secured to the armrest 23 and an arresting body 58b which extends from the base portion 58a towards the center in a left and right direction of the main body 22 of the seat 20 and is disposed on the femoral region UL (the left femoral region ULL, right femoral region ULR) at deployment. A lower surface of each of the arresting bodies 58b serves as an arresting plane 58c.

The lifting apparatus 101 is disposed inside the seat main body 22, in a front portion of a most sunken region 22c of an upper surface 22b of the seat main body 22. The most sunken region 22c of the seat main body 22 is a portion for buttocks B of an occupant OP to be set in, and is located proximate to the backrest 12. The lifting apparatus 101 includes a pair of actuators 102 disposed at left and right sides, a lifting head 103, and a pair of guide rails 105.

Each of the actuators 102 is composed of a micro gas generator (MGG). The actuator 102 is designed to extend a driving rod 102a rearward in response to an actuating signal. The rear end of each of the driving rods 102a is connected to the lifting head 103 which is formed into a rod extending in a left and right direction. The guide rails 105 are each disposed along a front and rear direction in left and right sides of the seat main body 22, and each include a guide hole 105 elongated in the front and rear direction. One each guide pin 104 is disposed on left and right ends of the lifting head 103, and the guide pins 104 are inserted into the guide holes 105. When the driving rods 102a extend rearwardly, the guide pins 104 respectively slide in the guide holes 105 rearwardly such that the lifting head 103 moves rearwardly and lifts a front portion 22d of the most sunken region 22c of the seat main body 22. The front portion 22d lifted by the lifting head 103 stops the buttocks B of the occupant OP from moving forward.

The inflators 57 of the thigh arresting device 56 and the actuators 102 of the lifting apparatus 101 are actuated by an actuating signal fed from a not-shown control device as has received a collision signal from a predetermined collision sensor.

In the seat device 10A of the second embodiment, when the inflators 57 of the thigh arresting device 56 are actuated and inflate the airbags (i.e. thigh arresting portions) 58L and 58R, the airbags 58 break open covers 59 and protrude from the storage positions FP7 disposed in the armrests 23L and 23R, and are deployed on the femoral regions UL of the occupant OP. Then the lower surface (i.e. the arresting body) 58c of the arresting body 58b of the airbag 58L restrains the left femoral region ULL, while the lower surface 58c of the arresting body 58b of the airbag 58R restrains the right femoral region ULR. Therefore, the airbags 58 restrain the femoral regions UL from moving forward and prevent the occupant OP from submarining, i.e. from sliding out from under the seatbelt 5 and going down the seat 20, thus protecting the occupant OP adequately.

In parallel, when the actuators 102 of the lifting apparatus 101 are actuated, the driving rods 102a of the actuators 102 push the lifting head 103 rearward, such that the lifting head 103 moves rearward with the guide pins 104 sliding on the inner circumferences of the guide holes 105a of the guide rails 105 as indicated with double-dotted lines in FIGS. 9 and 10, and lifts the front portion 22d of the most sunken region 22c of the seat main body 22 in order to restrain the buttocks B of the occupant OP from moving forward. Therefore, the seat device 10A is able to restrain the occupant OP from moving forward further surely by cooperation of the lifting apparatus 101 and the thigh arresting device 56.

Figure 12:
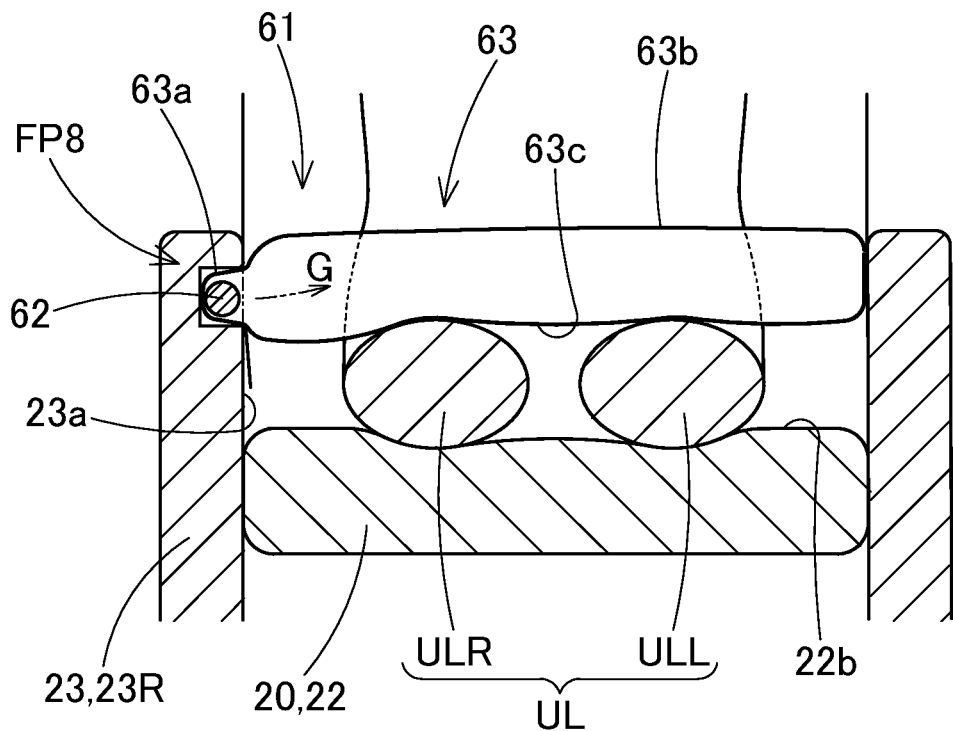
FIG. 12 is a schematic vertical sectional view of a modification of the thigh arresting device of the second embodiment.

Although the thigh arresting device 56 of the second embodiment uses two airbags 58 (58L, 58R) as the thigh arresting portion, the thigh arresting portion may alternatively be composed of one airbag 63, as in a thigh arresting device 61 depicted in FIG. 12. The thigh arresting device 61 has a storage position FP8 in one of the armrests 23, and an airbag 63 and an inflator (gas source) 62 is stored in the storage position FP8. When fed with an inflation gas G from the inflator 62, the airbag 63 is so deployed that an arresting body 63b protrudes from a base portion 63a housing the inflator 62, and covers the upper surfaces of the left and right femoral regions ULL and ULR, such that a lower surface 68c of the arresting body 68b restrains the femoral regions UL. That is, in the thigh arresting device 61, the single airbag 63 restrains the femoral regions UL from moving forward and prevents the occupant OP in a reclining posture from submarining, i.e. from going down the seat 20, thus protecting the occupant OP adequately.

Of course, the airbags (the thigh arresting portions) 58L, 58R of the second embodiment restrain the femoral regions UL of the occupant OP from moving forward and protect him from submarining also when he sits in a normal upright posture.

Figure 13:
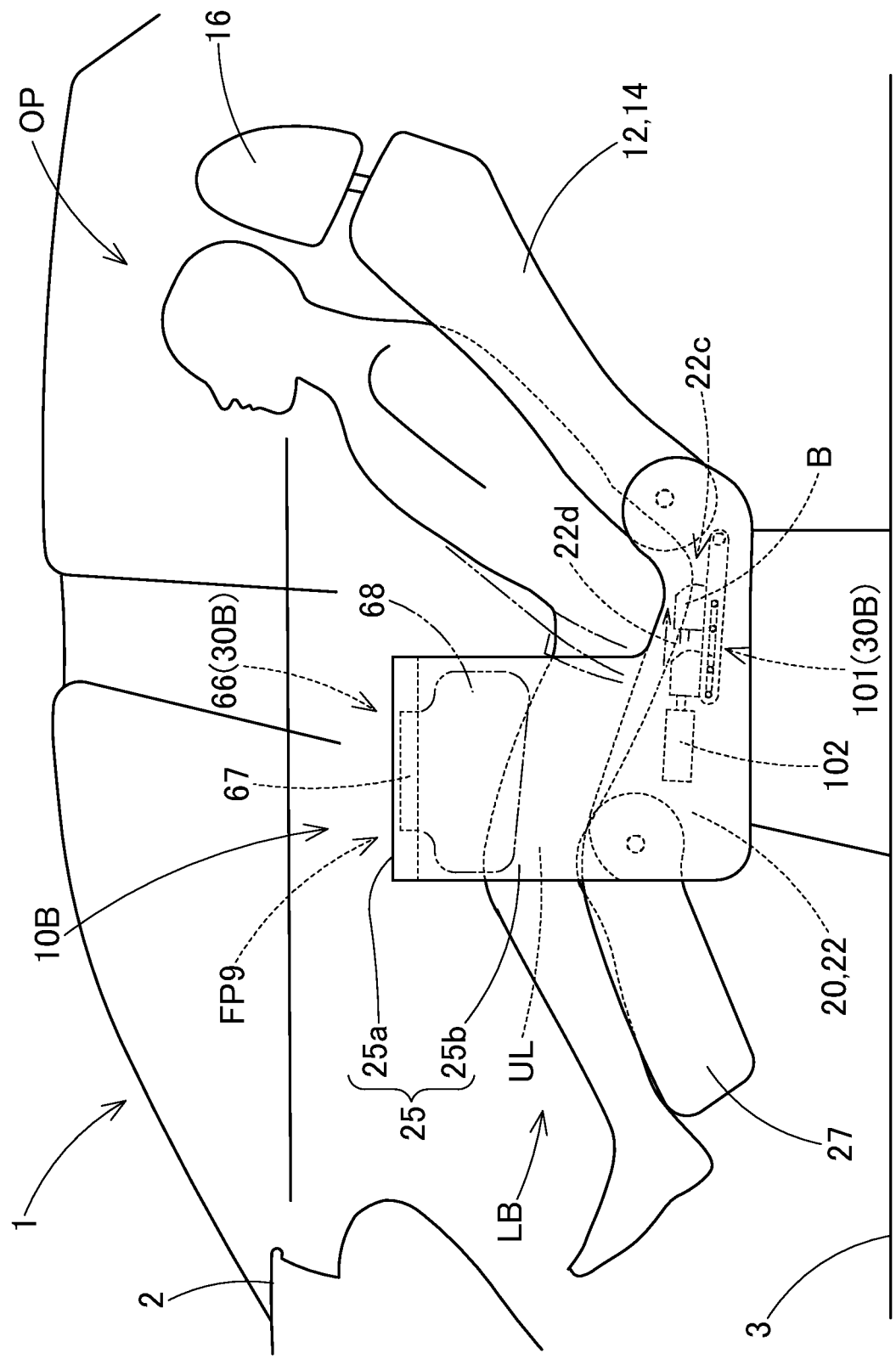
FIG. 13 is a schematic side view of a seat device according to a third embodiment of the invention.
Figure 14:
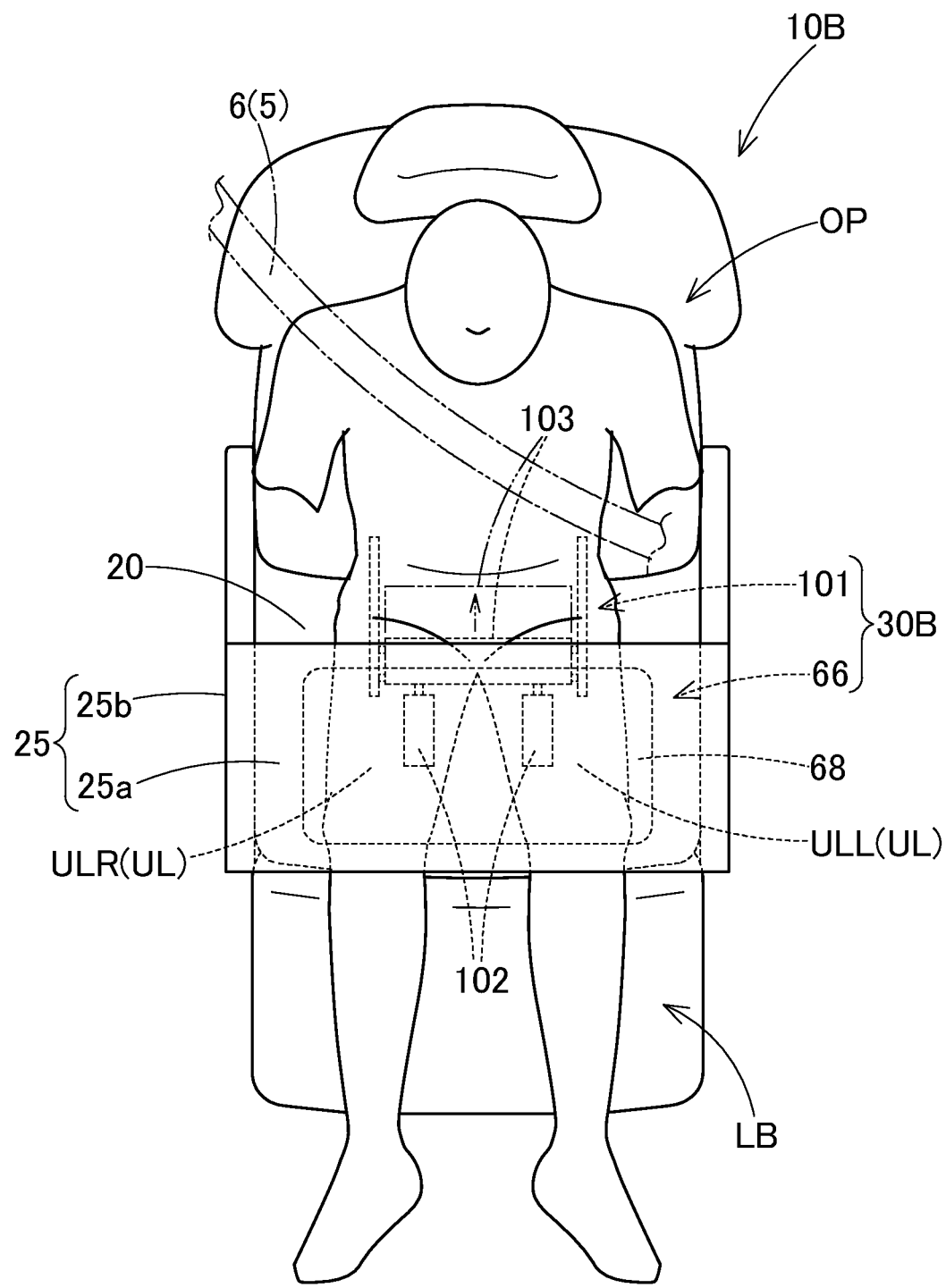
FIG. 14 is a schematic plan view of the seat device of the third embodiment as actuated.
Figure 15:
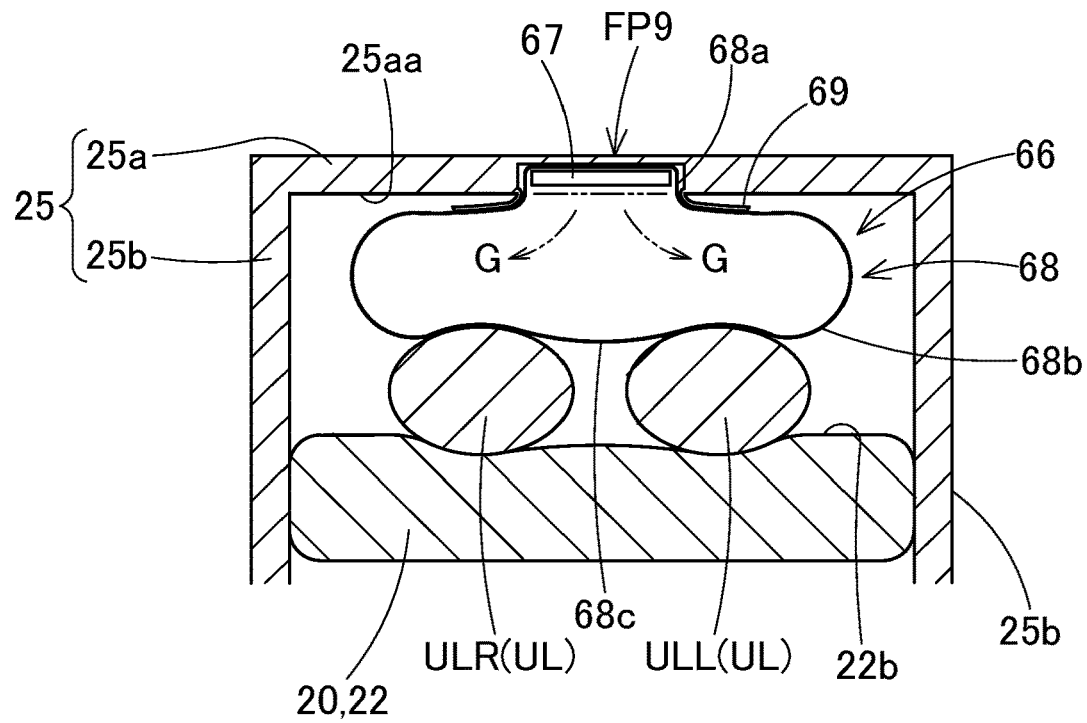
FIG. 15 is a schematic vertical sectional view of the seat device of the third embodiment as actuated, taken along a left and right direction at a thigh arresting device.

A third embodiment of the invention is now described referring to FIGS. 13 to 15. In a similar fashion to the first embodiment, a seat device 10B in the third embodiment includes a backrest 12 and a seat 20. The backrest 12 includes a headrest 16 on the top of the main body 14, and the seat 20 includes a main body 22 and a legrest 27 which is disposed in front of the main body 22. The seat 20 further includes a table 25 which includes a top board 25a and a pair of legs 25b extending from left and right sides of the top board 25a towards left and right edges of the seat 20. The seat device 10B includes an occupant arresting device 30B which includes a thigh arresting device 66 and a lifting apparatus 101. The lifting apparatus 101 has similar configurations to that of the seat device 10A of the second embodiment, and therefore, descriptions of the lifting apparatus 101 is omitted. The top board 25a of the table 25 is detachable from the legs 25b. When an occupant OP sits down in the seat 20 and leaves the seat 20, the top board 25a is detached, and is coupled with the left and right legs 25b with not-shown connecting members after seating.

The thigh arresting device 66 has a storage position FP9 in an underside 25aa of the top board 25a of the table 25, and an airbag (as a thigh arresting portion) 68 and an inflator (as a gas source) 67 for feeding the airbag 68 with an inflation gas G are stored in the storage position FP9. The airbag 68 includes a base portion 68a which houses the inflator 67 and is secured to the underside 25aa of the top board 25a, and an arresting body 68b which extends from the base portion 68a and is deployable downward in a generally oval spherical contour, in such a manner as to be thrusted against upper surfaces of the femoral regions UL of the occupant OP. A lower surface 68c of the arresting body 68b serves as an arresting plane that restrains the femoral regions UL.

Similarly to the second embodiment, the inflator 67 of the thigh arresting device 66 and the actuators 102 of the lifting apparatus 101 are actuated by an actuating signal fed from a not-shown control device as has received a collision signal from a predetermined collision sensor.

In the seat device 10B of the third embodiment, when the inflator 67 of the thigh arresting device 66 is actuated and inflates the airbag (i.e. thigh arresting portion) 68, the airbag 68 breaks open a cover 69 and protrudes from the storage position FP9 disposed in the underside 25aa of the top board 25a of the table 25, and is deployed towards the femoral regions UL of the occupant OP, such that the lower surface (as the arresting plane) 68c of the arresting body 68b of the airbag 68 holds in the femoral regions UL. By restraining the femoral regions UL from moving forward, the airbag 68 prevents the occupant OP in a reclining posture from submarining, i.e. from going down the seat 20, thus protecting the occupant OP adequately.

In parallel, when the actuators 102 of the lifting apparatus 101 are actuated, the lifting head 103 moves rearward and lifts the front portion 22d of the most sunken region 22c of the seat main body 22 in order to restrain the buttocks B of the occupant OP from moving forward. Therefore, the seat device 10B is able to restrain the occupant OP from moving forward further surely by cooperation of the lifting apparatus 101 and the thigh arresting device 66.

Of course, similarly to the first and second embodiments, the airbag (the thigh arresting portion) 68 of the third embodiment restrains the femoral regions UL of the occupant OP from moving forward and protects him from submarining also when he sits in a normal upright posture.

In the seat device 10B of the third embodiment, the thigh arresting portion of the thigh arresting device 66 is composed of the airbag 68 which is inflatable with an inflation gas G. Alternatively, the thigh arresting portion may also be composed of a shape retentive pad 76 designed to be deployed to an arresting position SP by operation of a mechanical deployment apparatus 72, as in a thigh arresting device 71 depicted in FIGS. 16 and 17. In the illustrated embodiment, the pad 76 as the arresting portion is formed into a generally rectangular board capable of arresting the femoral regions UL of the occupant OP. A storage position FP10 of the thigh arresting device 71 is disposed in the underside 25aa of the top board 25a of the table 25, such that the pad 76 is deployed therefrom by the deployment apparatus 72 to the arresting position SP on upper surfaces of the femoral regions LU.

Figure 16:
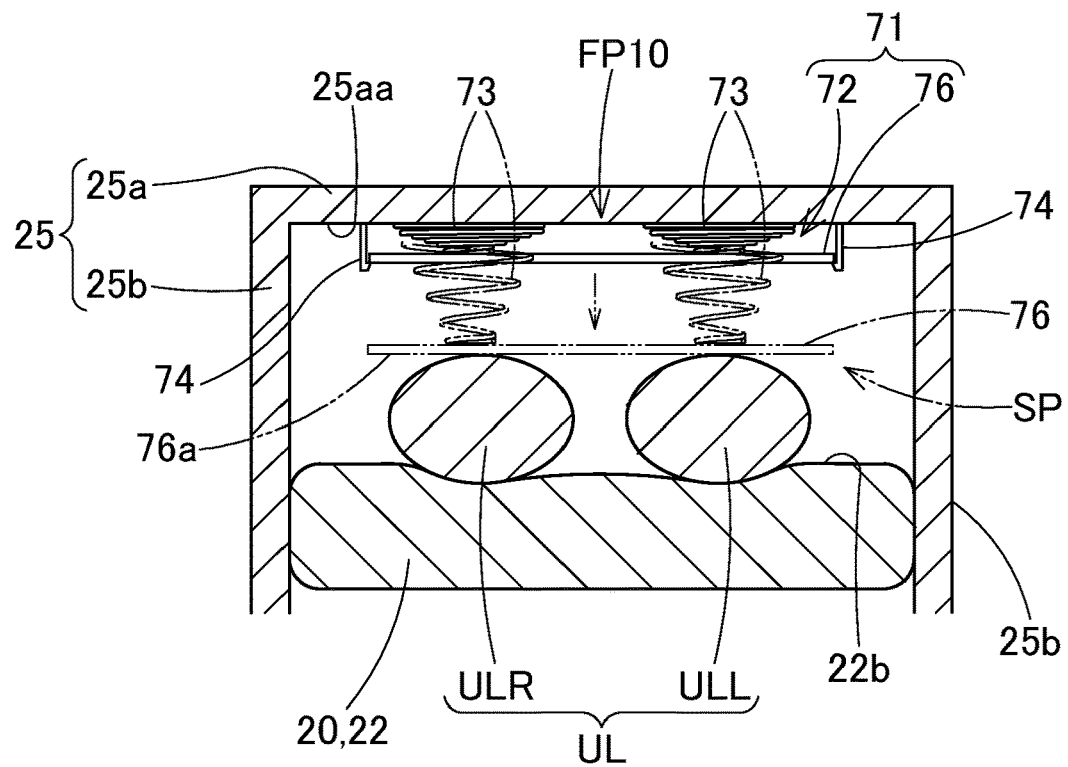
FIG. 16 is a schematic vertical sectional view of a modification of the thigh arresting device of the third embodiment.

Referring to FIGS. 16 and 17, the deployment apparatus 72 includes a plurality of (two, in the illustrated embodiment) springs (coil springs) 73 which bias the pad 76 downward, a plurality of (two, in the illustrated embodiment) stopper pins 74 which retain the pad 76 in the storage position FP10, and a plurality of (two, corresponding to the number of the stopper pins 74) actuators 75 each of which is composed of a push electromagnetic solenoid or the like. Each of the actuators 75 is designed to eject and retract a push pin 75a in response to an actuating signal fed from a not-shown control device as has detected a collision of the vehicle. Each of the stopper pins 74 is configured to swing in a left and right direction about a pivot portion 74c provided with a return spring, and includes a retaining hook 74a for retaining the pad 76 at the lower end. A root portion 74b disposed at the upper end portion of each of the stopper pins 74 is in contact with the push pin 75 of the actuator 75.

Figure 17A:
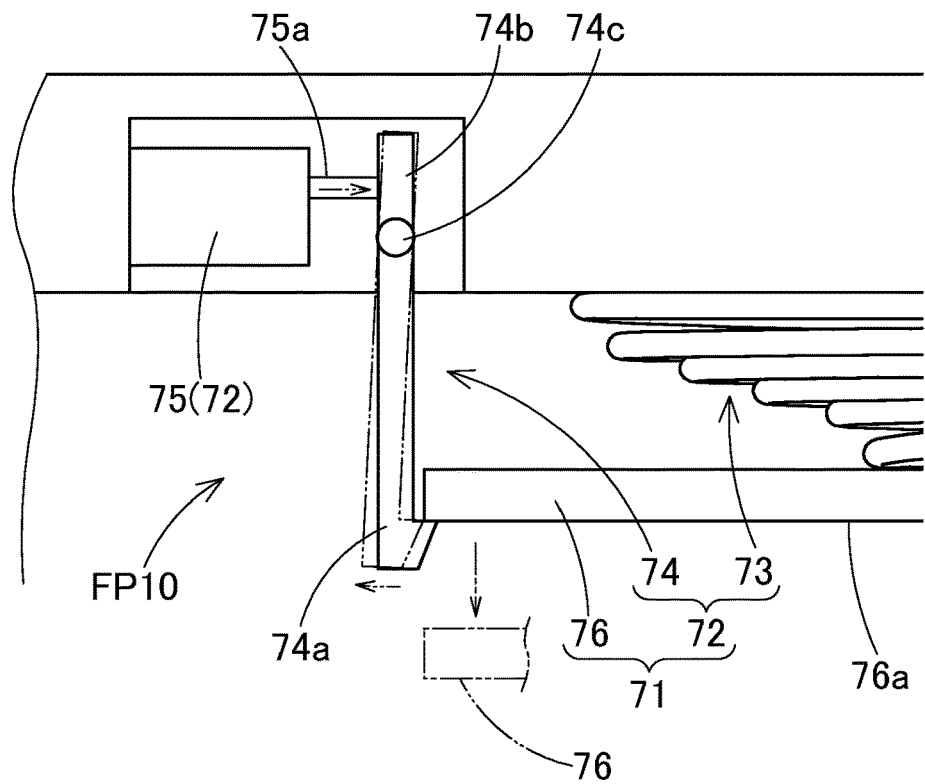
FIG. 17A illustrates a behavior of the thigh arresting device of FIG. 16 as actuated.

In the thigh arresting device 71, when the actuators 75 are actuated with an actuating signal, each of the actuators 75 extends the push pin 75 and pushes the root portion 74b of the stopper pin 74. The stopper pin 74 pushed by the push pin 75 turns about the pivot portion 74c, such that the hook 74a is disengaged from an edge of the pad 76, as shown in FIG. 17A. Then the pad 76 is deployed from the storage position FP10 to the arresting position SP by a biasing force of the springs 73, such that a lower surface (as an arresting plane) 76a of the pad 76 thrusts at the femoral regions UL of the occupant OR. Therefore, by restraining the femoral regions UL from moving forward, the pad (i.e. the thigh arresting portion) 76 prevents the occupant OP from submarining, i.e. from going down the seat 20, thus protecting the occupant OP adequately.

Figure 17B:
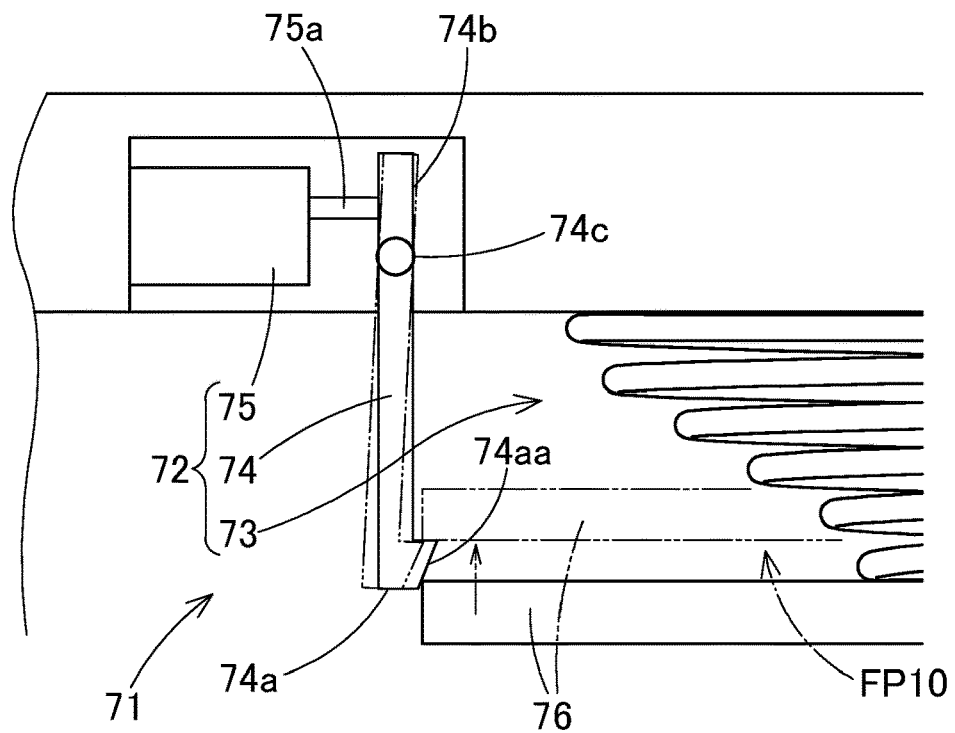
FIG. 17B illustrates a reinstatement of a thigh arresting portion of the thigh arresting device of FIG. 16.

The pad 76 can be returned to the storage position FP10, as shown in FIG. 17B. Specifically, if the pad 76 is lifted after once having deployed, the pad 76 is brought into abutment with and slides on slant surfaces 74aa of the retaining hooks 74a of the stopper pins 74, and each of the stopper pins 74 turns, such that the pad 76 is returned to the storage position FP10. The return springs provided in the pivot portions 74c also bias the retaining hooks 74a to the position for retaining the pad 76. Thus the thigh arresting device 71 can be returned to a stand-by state for a next collision.

Figure 19:
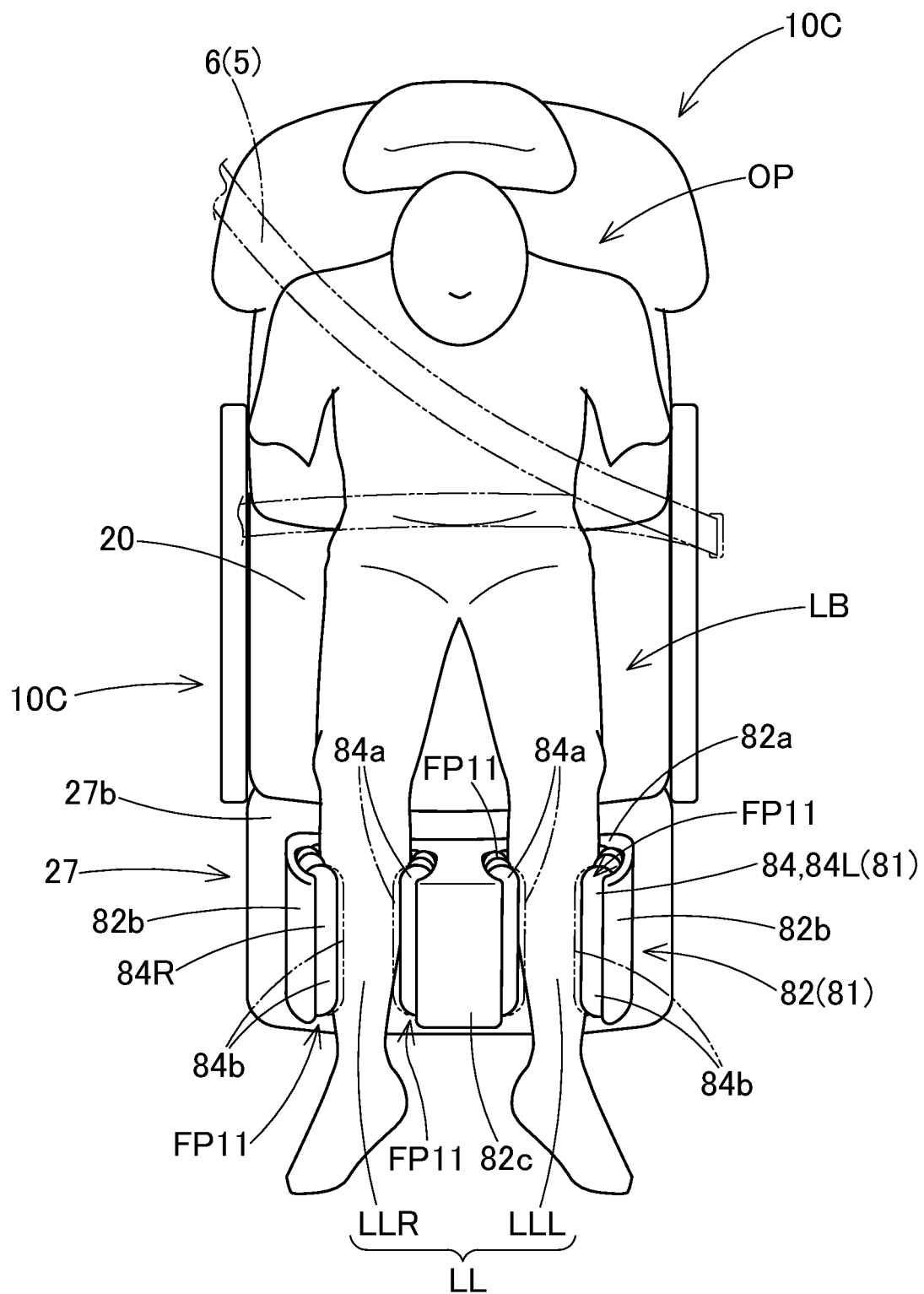
FIG. 19 is a schematic plan view of the seat device of the fourth embodiment.
Figure 20A:
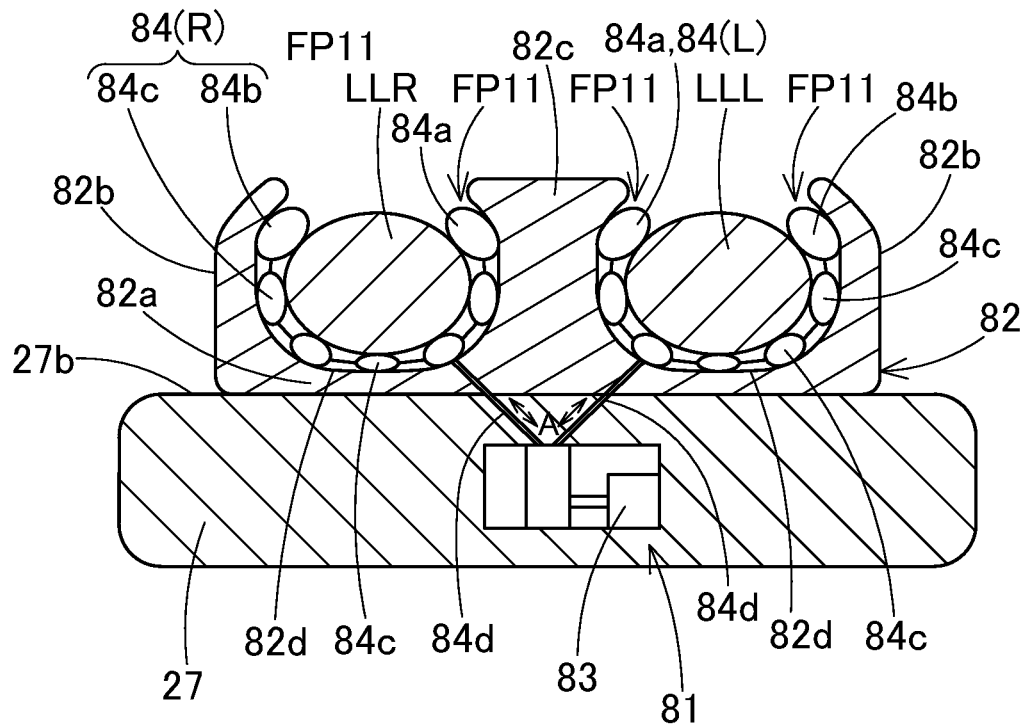
FIG. 20A illustrates a behavior of a leg arresting device of the seat device of the fourth embodiment in a massage mode in a schematic vertical sectional view.

A fourth embodiment of the invention is now described referring to FIGS. 18 to 20. In a similar fashion to the first embodiment, a seat device 10C in the fourth embodiment includes a backrest 12 and a seat 20. The backrest 12 includes a headrest 16 on the top of the main body 14, and the seat 20 includes a main body 22 and a legrest 27 which is disposed in front of the main body 22. A leg arresting device 81 of the seat device 10C is located on the surface 27b of the legrest 27.

The leg arresting device 81 includes a pair of air pads (as leg arresting portions) 84 (84L, 84R), an air-feeding apparatus 83 which feeds the air pads 84 with an air A, and a supporting base 82 which supports the air pads 84. The supporting base 82 includes a bottom plate 82a, left and right support plates 82b which extend upward from the left and right edges of the bottom plate 82a, and a center support plate 82c which extends upward from a center in a left and right direction of the bottom plate 82a. The air pads 84 are stored in concave portions (as a storage positions FP11) 82d on the left and right of the center support plate 82c. Each of the air pads 84 and the air-feeding apparatus 83 are connected with a tube 84d through which the air A is supplied.

Figure 20B:
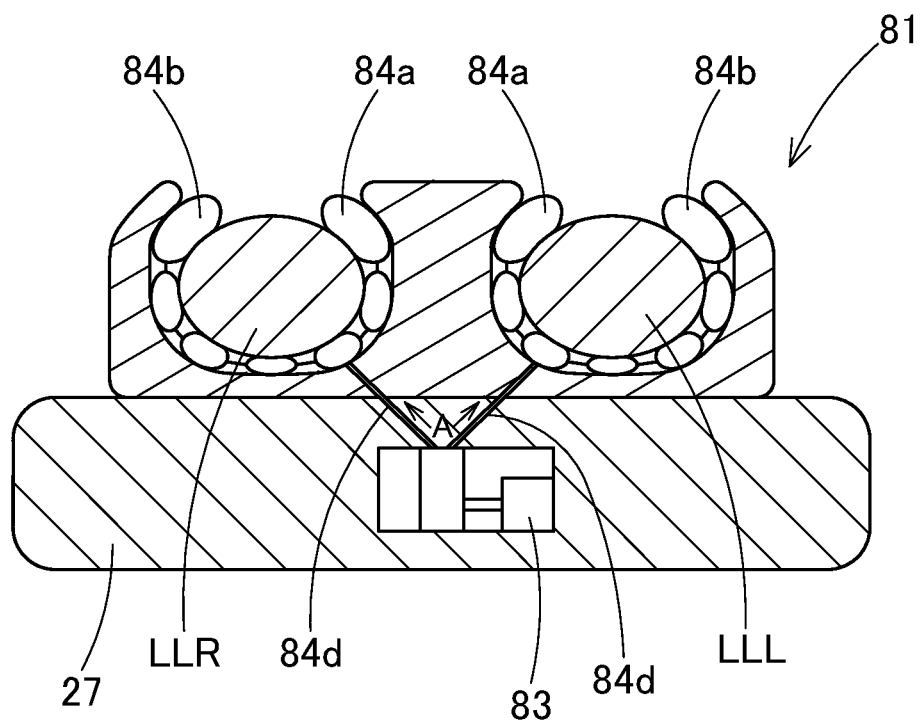
FIG. 20B illustrates a behavior of the leg arresting device of the fourth embodiment in an arresting mode in a schematic vertical sectional view.

Each of the air pads 84L and 84R includes a plurality of cells 84a, 84b, 84c of various sizes and is usually used to massage left/right lower leg LLL, LLR of an occupant OP with the cells 84a, 84b, 84c disposed around the lower leg LLL, LLR. When a not-shown operation switch of the air-feeding apparatus 83 is turned on, the apparatus 83 feeds an air A to and exhaust the air A from the air pads 84L and 84R, thus the air pads 84L and 84R massage the left and right lower legs LLL, LLR. Then in the event of a collision of the vehicle 1, the air-feeding apparatus 83 feeds an air A to the air pads 84L and 84R, which air is higher in pressure than in a massage mode, in response to an actuating signal from the not-shown control device. The cells 84a, 84b and 84c of the air pads 84L and 84R are then more inflated than in the massage mode as shown in FIG. 20B. Especially, the large cells 84a and 84b disposed on the uppermost positions are greatly inflated, and deployed over upper surfaces of the left and right lower legs LL, each from the storage positions FP11. That is, the large cells 84a and 84b of each of the air pads 84L and 84R are deployed over the lower leg LL (LLL, LLR) in such a manner as to sandwich and hold the lower leg LL from both sides, thus restraining the lower leg LL from moving forward.

In the seat device 10C, when a collision of the vehicle 1 occurs, the air pads (i.e. leg arresting portion) 84L and 84R, especially the large cells 84a and 84b of the air pads disposed on the surface 27b of the legrest 27, restrain the lower legs LL of the occupant OP from moving forward and prevent the occupant OP from submarining, i.e. from going down the seat 20 forward, thus protecting the occupant OP in a reclining posture adequately.

Of course, similarly to the first to third embodiments, the air pads (the thigh arresting portion) 84L and 84R (especially the large cells 84a and 84b) restrain the lower legs LL of the occupant OP from moving forward and protect him from submarining also when he sits in a normal upright posture.

Figure 21:
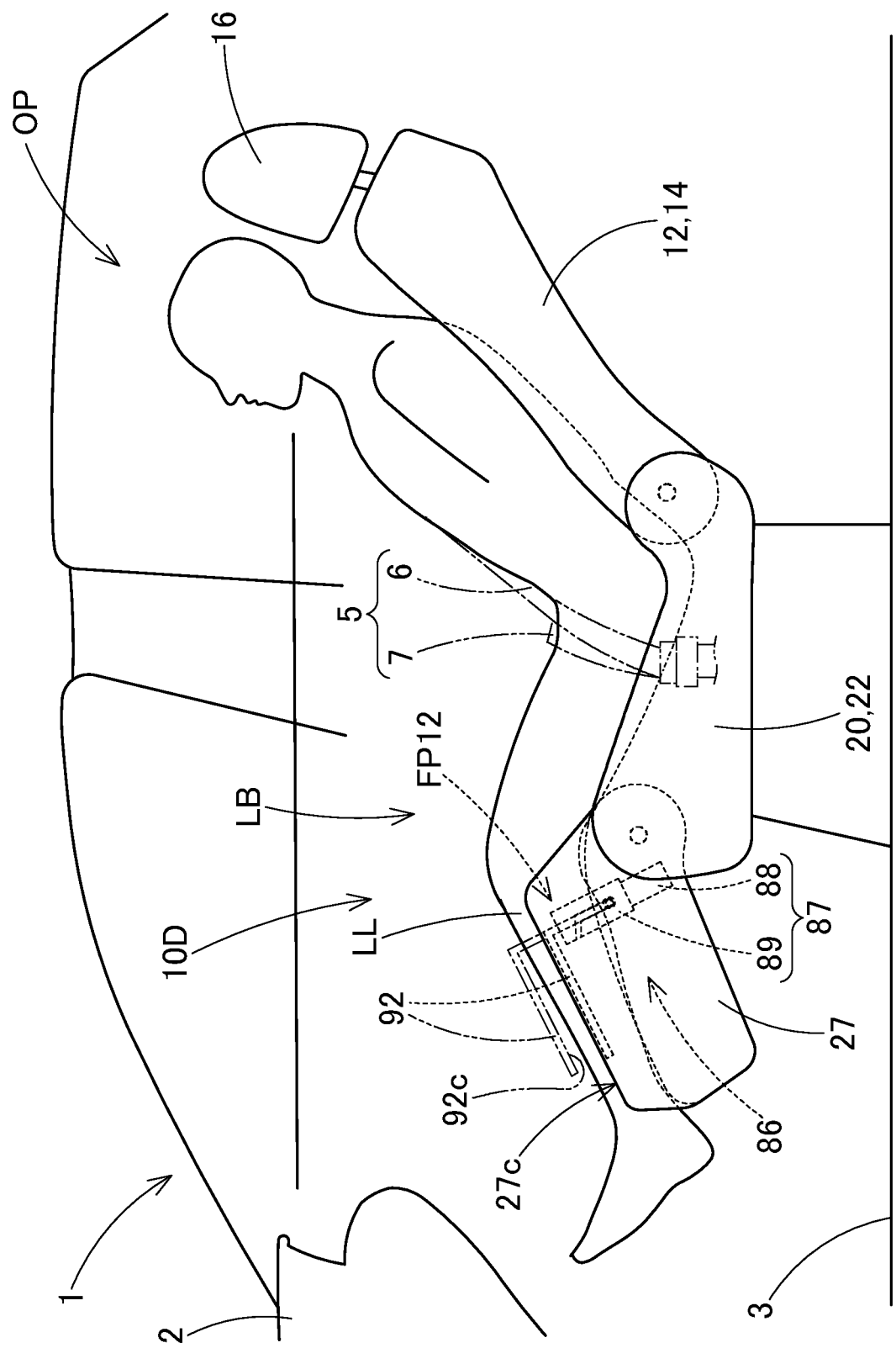
FIG. 21 is a schematic side view of a seat device according to a fifth embodiment of the invention.
Figure 22:
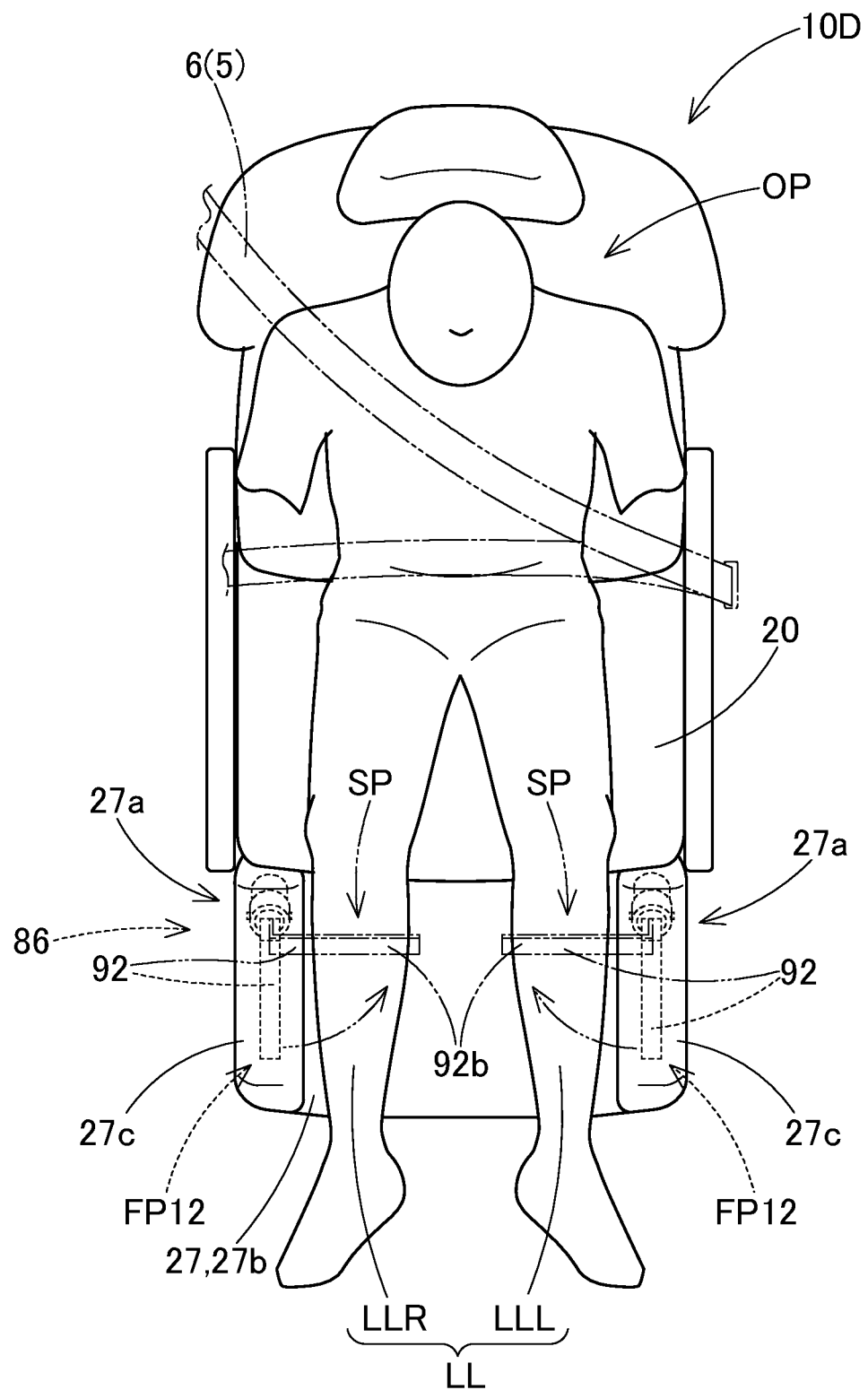
FIG. 22 is a schematic plan view of the seat device of the fifth embodiment.
Figure 23A:
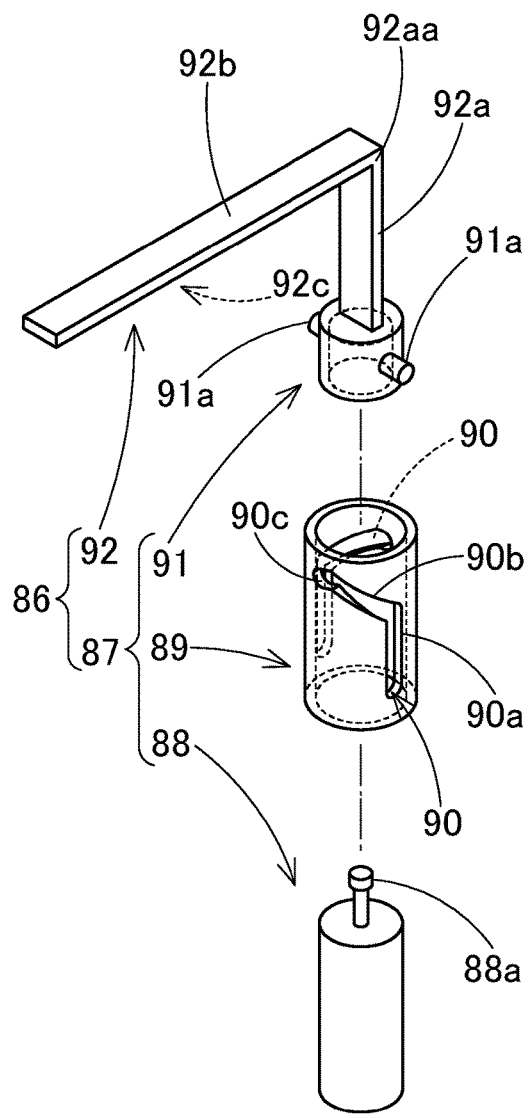
FIG. 23A is an exploded perspective view of a leg arresting portion and a deployment apparatus of a leg arresting device of the fifth embodiment.

A fifth embodiment of the invention is now described referring to FIGS. 21 to 23. In a similar fashion to the first embodiment, a seat device 10D in the fifth embodiment includes a backrest 12 and a seat 20. The backrest 12 includes a headrest 16 on the top of the main body 14, and the seat 20 includes a main body 22 and a legrest 27 which is disposed in front of the main body 22. A leg arresting device 86 of the seat device 10D is disposed in a vicinity of each of left and right sides 27a of the legrest 27, more particularly, in left and right end portions 27c of the surface 27a of the legrest 27.

The leg arresting device 86 includes a pair of arresting bars 92 each of which has shape retention and serves as a leg arresting portion, and a pair of deployment apparatuses 87 each of which deploys each of the arresting bars 92 mechanically from a storage position FP12 to an arresting position SP. Each of the arresting bars 92 is formed into a generally L shape, including a root region 92a which extends in an up and down direction and an arresting body 92b which extends orthogonally to the root region 92a from an upper end 92aa of the root region 92a. When actuated, the arresting bodies 92b of the left and right arresting bars 92 are deployed in front of the lower legs LL (LLL and LLR) of an occupant OP and restrain the lower legs LL from moving forward.

The deployment apparatuses 87 are disposed in an interior of the legrest 27, in the left and right end portions 27c of the legrest 27. Referring to FIG. 23, each of the deployment apparatuses 87 includes an actuator 88 which is composed of a micro gas generator or the like, a guide tube 89 which is coupled with the actuator 88 by the lower end, and a guide block 91 secured to a lower end of the root region 92a of the arresting bar 92. The guide block 91 is provided with two guide pins 91a protruding from the outer circumference. The guide tube 89 is provided with two guide slots 90 which go through the circumference. The two guide slots 90 are disposed at point-symmetric positions of the guide tube 89, and each include a straight portion 90a which extends in an up and down direction, a slant portion 90b which extends obliquely upward for an angle of 90 degrees from an upper end of the straight portion 90a, and a terminal portion 90c which is continuous with an upper end of the slant portion 90b and extends in a circumferential direction of the guide tube 89. The guide block 91 is set inside the guide tube 89 such that the guide pins 91a of the guide block 91 go through the guide slots 90 and protrude outwardly, and such that a push-up pin 88a of the actuator 88 abuts against a lower end surface of the guide block 91. The left and right guide tubes 89 are so disposed that the respective set of the guide slots 90 form a bilateral symmetry.

Figure 23B:
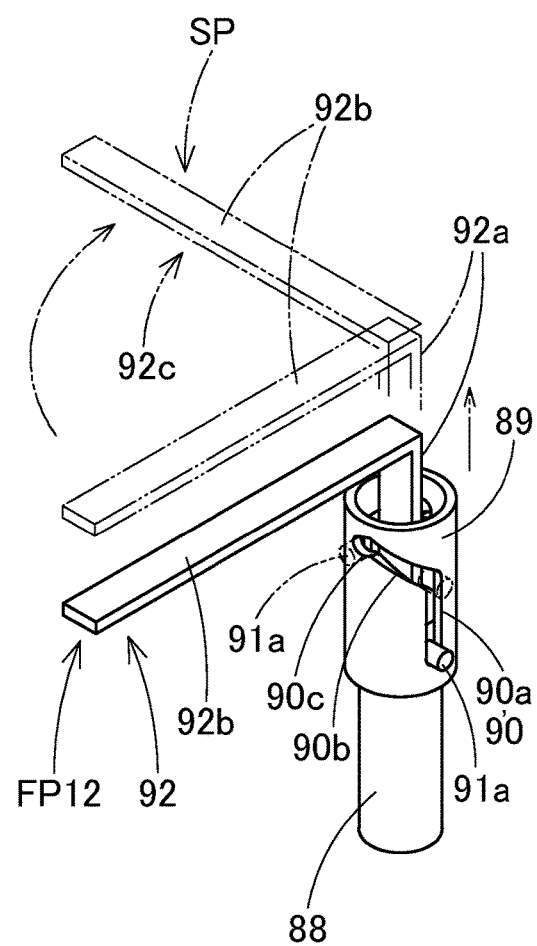
FIG. 23B is a diagram illustrating a behavior of the leg arresting device of FIG. 23A as actuated.

When the actuators 88 are actuated in response to an actuating signal fed from the not-shown control device as has detected a collision of the vehicle 1, each of the actuators 88 pushes up the push-up pin 88a, and the push-up pin 88a pushes up the guide block 91, such that the guide block 91 ascends inside the guide tube 89 together with the arresting bar 92. At this time, the guide pins 91a of the guide block 91 respectively move upward in the straight portions 90a of the guide slots 90 of the guide tube 89, such that the arresting bar 92 secured to the guide block 91 ascends from the storage position FP12 as indicated with double-dotted lines in FIG. 21 and FIG. 23B. The guide pins 91a further go into the slant portions 90b of the guide slots 90 respectively, then into the terminal portions 90c, such that the arresting body 92a of the arresting bar 92 turns 90 degrees about the guide tube 89, as shown in FIG. 22 and FIG. 23B (with double-dotted lines), thus deployed at the arresting position SP, i.e. in front of the lower leg LL (LLL, LLR) of the occupant OP. Therefore, in the leg arresting device 81, the left and right arresting bodies 92b of the arresting bars (i.e. the leg arresting portions) 92 respectively restrain the left and right lower legs LLL and LLR by the lower surfaces (i.e. arresting planes) 92c from moving forward, and protect the occupant OP in a reclining posture from submarining.

Of course, similarly to the first to fourth embodiments, the arresting bars (the leg arresting portions) 92 restrain the lower legs LL of the occupant OP from moving forward and protect him from submarining also when he sits in a normal upright posture.

The lifting apparatus 101 described in the second and third embodiments may also be used in the seat devices 10, 10C and 10D in the first, fourth and fifth embodiments.

Figure 24:
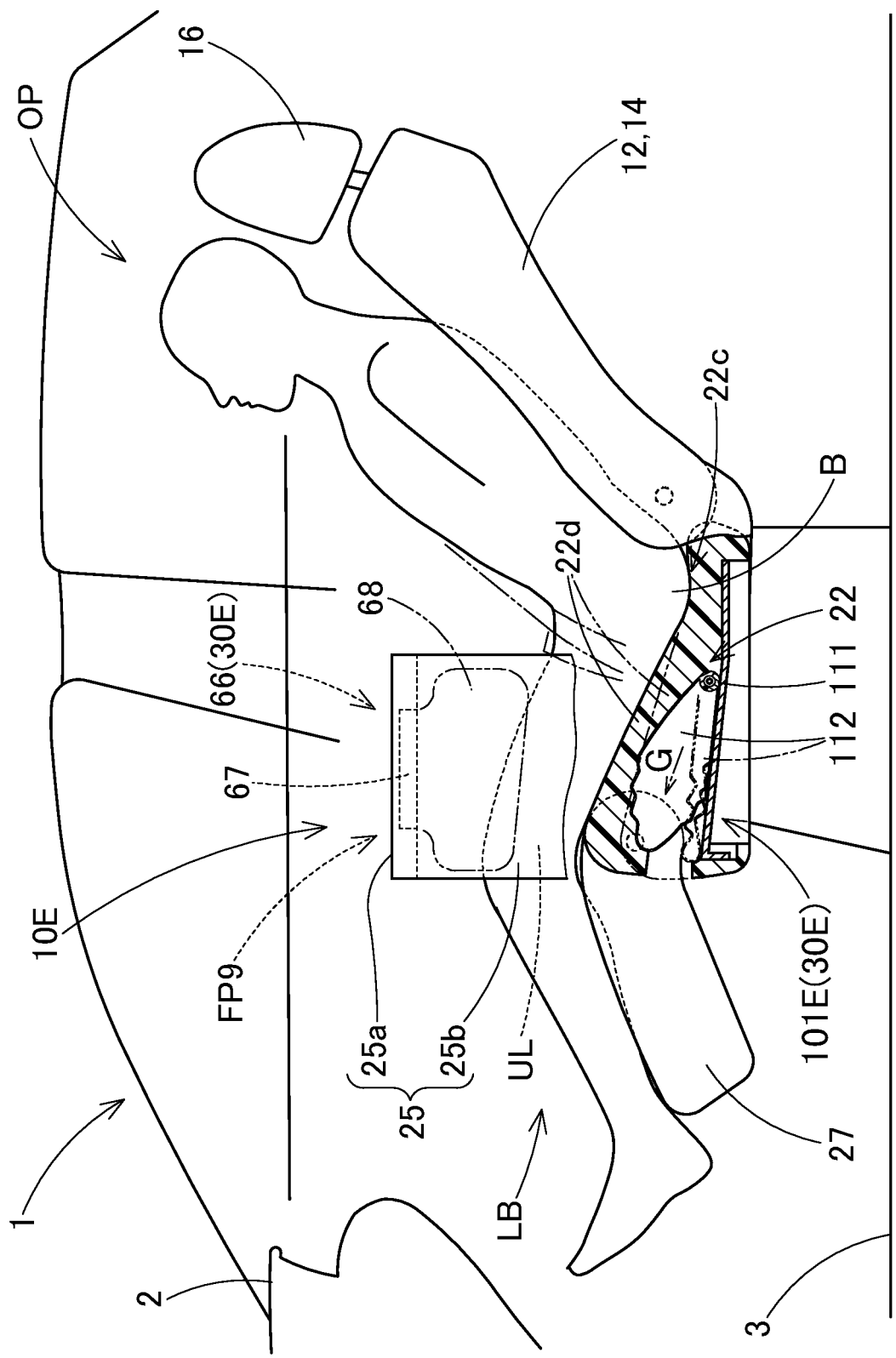
FIG. 24 is a schematic side view of a seat device according to a sixth embodiment of the invention as a lifting apparatus is actuated.
Figure 25:
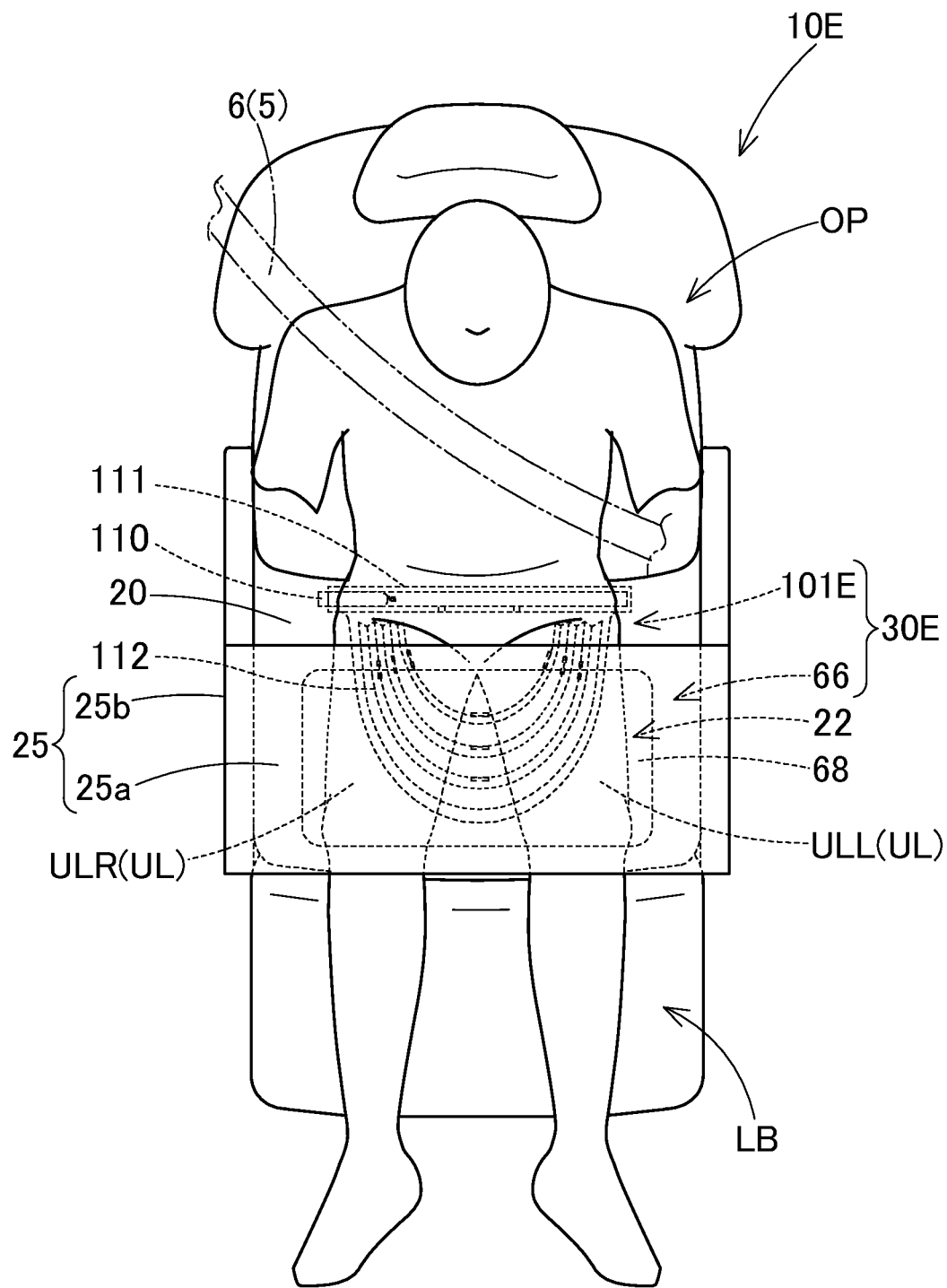
FIG. 25 is a schematic plan view of the seat device of the sixth embodiment.

The lifting apparatus 101 may also be configured as a lifting apparatus 101E used in the next sixth embodiment depicted in FIGS. 24 and 25. A seat device 10E according to the sixth embodiment includes a seat 20, a backrest 12, a thigh arresting device 66 and a lifting apparatus 101E which makes use of an airbag 112. The thigh arresting device 66 has similar configurations to that used in the seat device 10B of the third embodiment depicted in FIGS. 13 and 14, and therefore, descriptions of the thigh arresting device 66 is omitted.

The lifting apparatus 101E is disposed inside the seat main body 22, in the front portion 22d of the most sunken region 22c of the seat main body 22. The lifting apparatus 101E includes an airbag 112 which is designed to be inflated so as to raise the front portion 22d, and an inflator 110 which feeds the airbag 112 an inflation gas G. The airbag 112 internally includes a supply tube 111 which supplies the inflation gas G fed from the inflator 110 into the airbag 112. The supply tube 111 extends in a left and right direction at the rear end portion of the airbag 112, and is provided with a plurality of gas outlet ports of the inflation gas G.

In the seat device 10E of the sixth embodiment, when a collision of the vehicle 1 occurs, the inflator 67 of the thigh arresting device 66 of the occupant arresting device 30E is actuated and inflates the airbag (i.e. thigh arresting portion) 68, then the airbag 68 protrudes from the storage position FP9 disposed in the top board 25a of the table 25, and is deployed towards the femoral regions UL of the occupant OP. Thus the airbag 68 restrains the femoral regions UL from moving forward and prevents the occupant OP from submarining, i.e. from going down the seat 20 forward, thus protecting the occupant OP adequately.

In parallel, the inflator 110 of the lifting apparatus 101E is actuated and feeds the airbag 112 with an inflation gas G, such that the airbag 112 is inflated and lifts the front portion 22d of the most sunken region 22c of the seat main body 22, and restrains the buttocks B of the occupant OP from moving forward. Therefore, irrespective of sitting posture of the occupant OP, the seat device 10E is able to restrain a forward movement of the occupant OP further surely by cooperation of the lifting apparatus 101E and the thigh arresting device 66.

Figure 26:
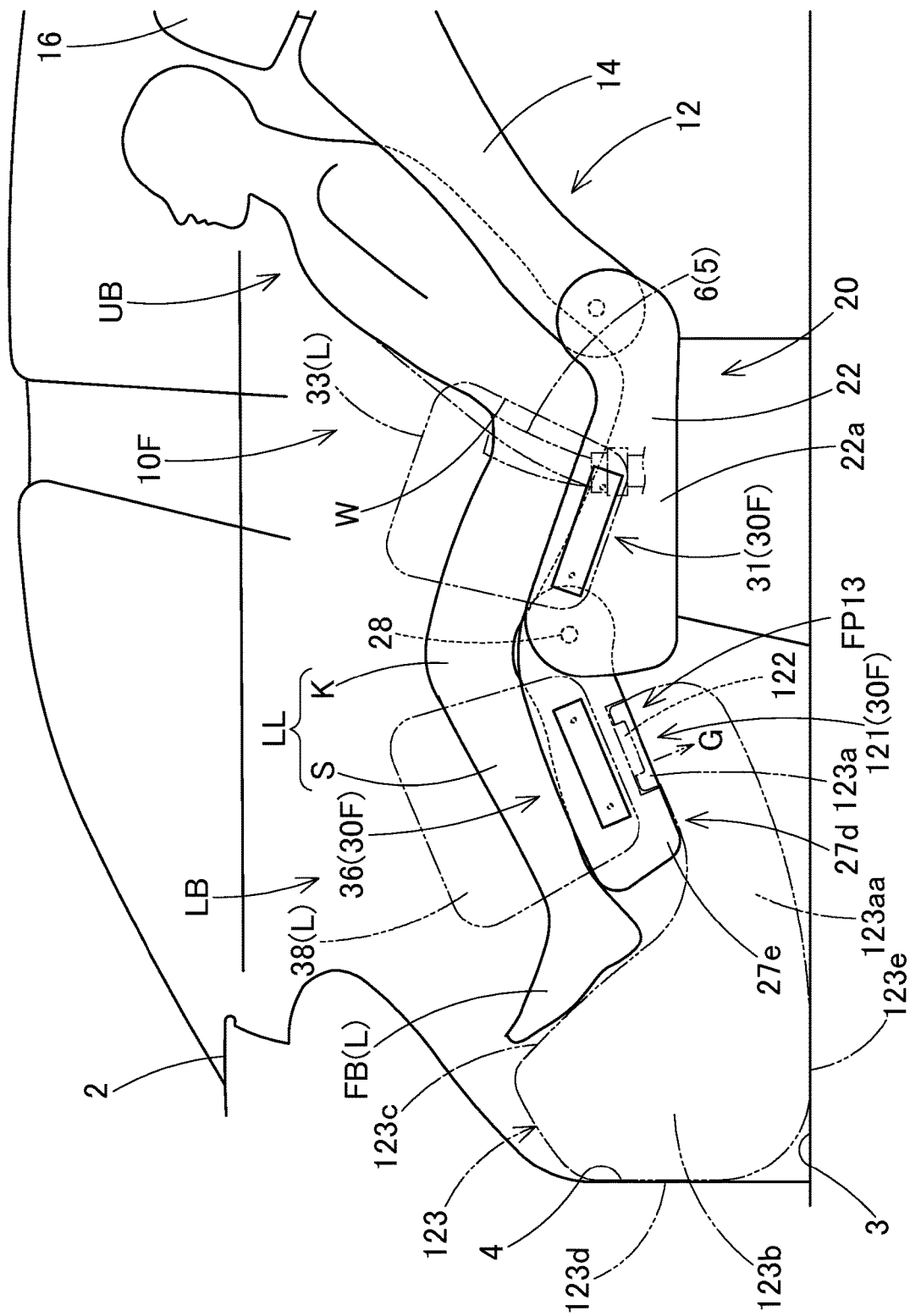
FIG. 26 is a schematic side view of a seat device of a seventh embodiment.
Figure 27:
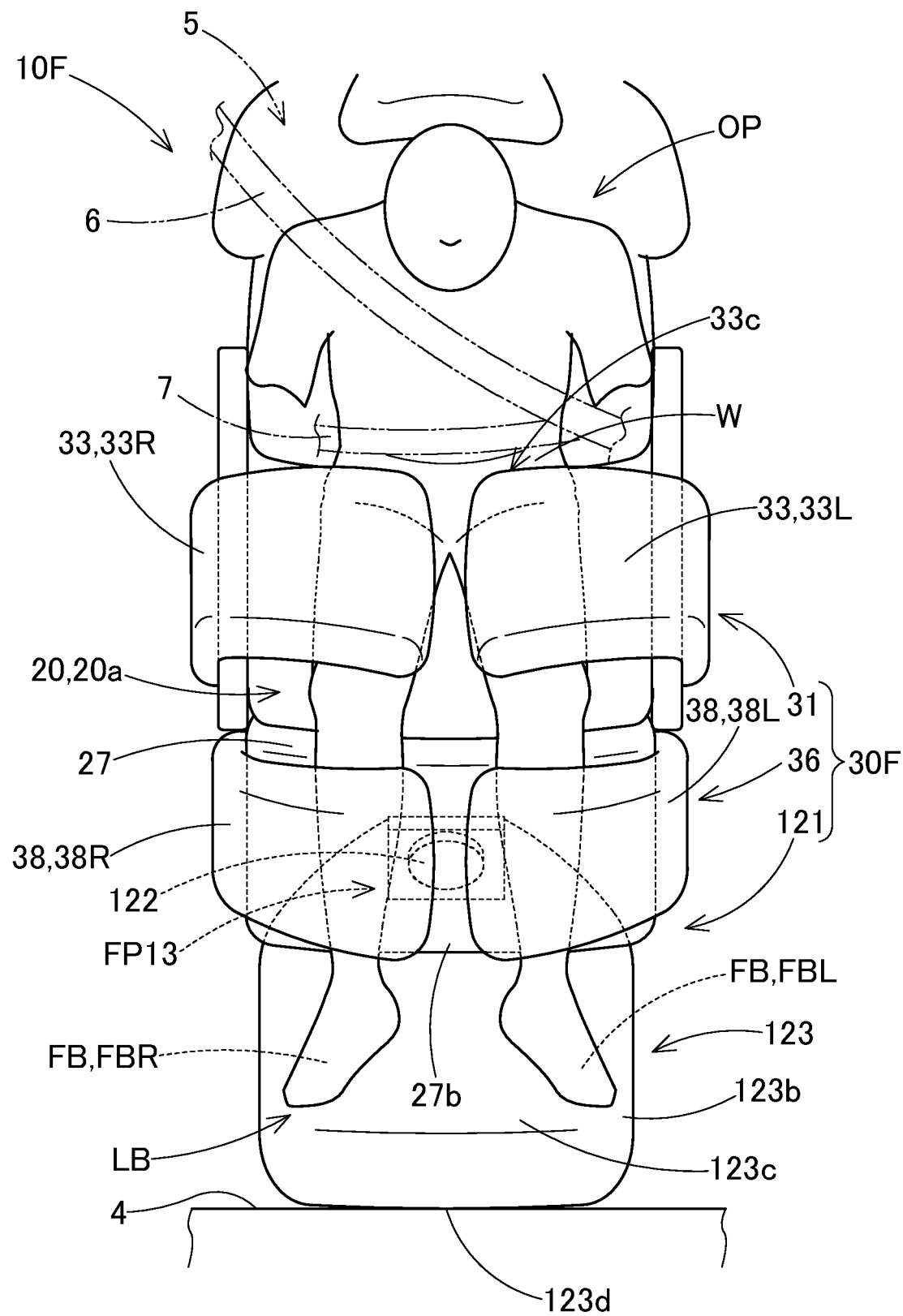
FIG. 27 is a schematic plan view of the seat device of the seventh embodiment.

In order to prevent a submarine phenomenon of an occupant OP sitting in a reclining posture, the seat device may be provided with a foot arresting device 121 that arrests soles FB of the occupant OP, as in a seat device 10F of the seventh embodiment of the invention depicted in FIGS. 26 and 27.

In a similar fashion to the first embodiment, the seat device 10F of the seventh embodiment includes a backrest 12, a seat 20, and an occupant arresting device 30F. The backrest 12 includes a headrest 16 on the top of the main body 14, and the seat 20 includes a main body 22 and a legrest 27 which is disposed in front of the main body 22. The occupant arresting device 30F includes a pelvis arresting device 31, a leg arresting device 36 and the foot arresting device 121. Each of the arresting devices 31 and 36 has similar configuration to those in the first embodiment, and therefore, description of the arresting devices 31 and 36 are omitted. The foot arresting device 121 is disposed in an underside 27d of the legrest 27.

More specifically, a storage position FP13 of the foot arresting device 121 is disposed in a central portion in a left and right direction of the underside 27d of the legrest 27. An airbag 123 which serves as a foot arresting portion, and an inflator 122 which feeds the airbag 123 with an inflation gas G are stored in the storage position FP13. The airbag 123 includes a base portion 123a which houses the inflator 122 and is secured to the storage position FP13, and an arresting body 123b which arrests the soles FB of the occupant OP. When fed with an inflation gas G, the base portion 123a protrudes from the storage position FP13 such that the front end 123aa is located between a lower end 27e of the legrest 27 and a floor 3 of the vehicle 1, and the arresting body 123b bends upward and extends forward from the front end 123aa of the base portion 123a, and is deployed in front of left and right soles FB (FBL, FBR). A rear surface of the airbag 123 serves as an arresting plane 123c that restrains the soles FB from moving forward. The airbag 123 internally includes a plurality of not-shown tethers. The bent deployed contour of the airbag 123 which bends at the front end 123aa of the base portion 123a can be made by adjusting an arrangement of the tethers.

When the airbag 123 is deployed, the arresting plane 123c of the arresting body 123b restrains the soles FBL and FBR of the occupant OP in a reclining posture from moving forward, thus preventing him from submarining.

Figure 28:
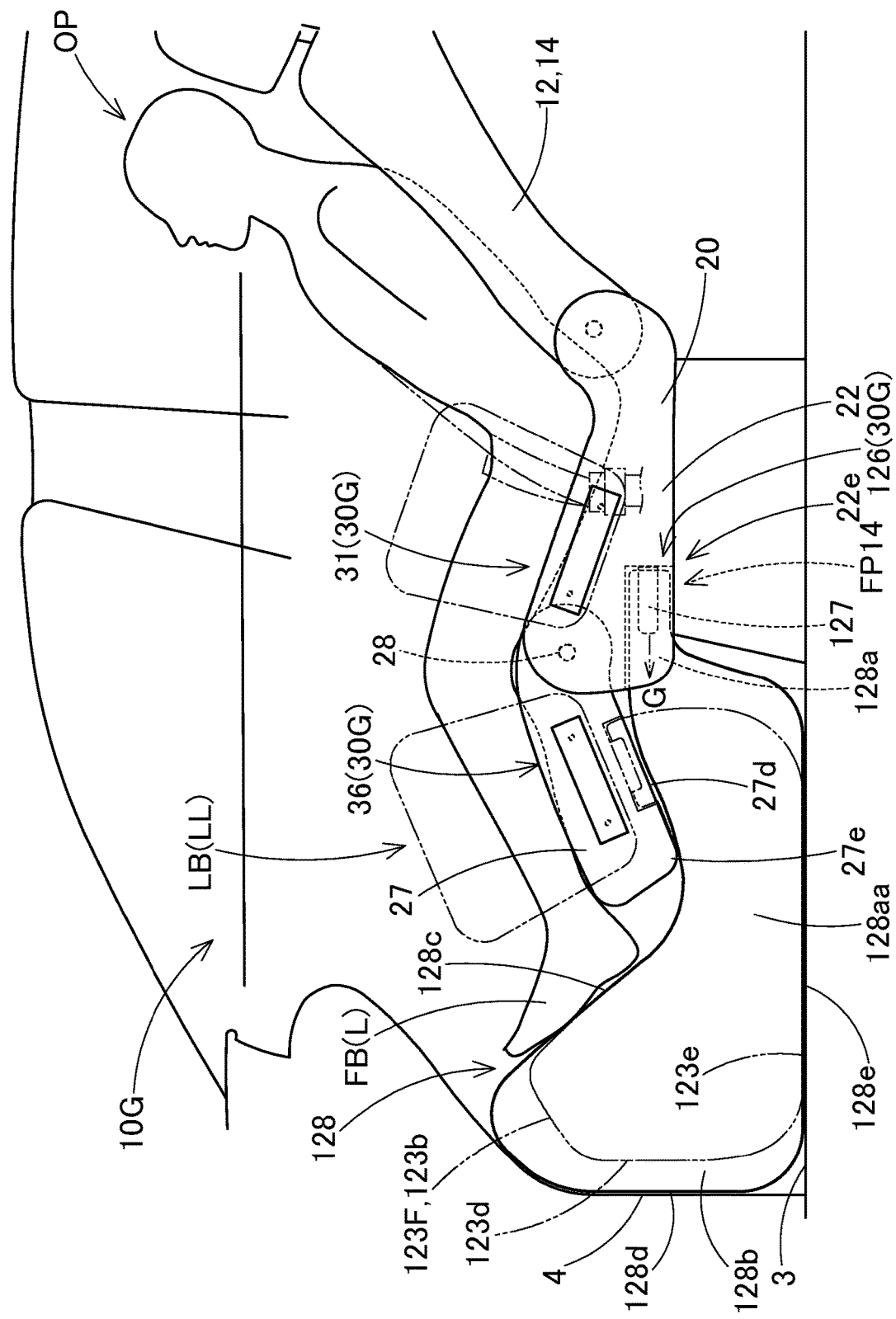
FIG. 28 is a schematic side view of a seat device according to an eighth embodiment.

The airbag 123 as inflated has a support surface that is supported by the front wall 4 and floor 3 of the vehicle 1 (i.e. by members of vehicle body) so as to secure a reaction force at arresting the soles FB. A front surface 123d and a lower surface 123e of the arresting body 123b as inflated both serve as the support surfaces. However, the airbag 123 as inflated has only to be supported by only one of the front wall 4 and floor 3 when deployed so as to secure an enough reaction force for arresting the soles FB. By way of example, as depicted in FIG. 28 with double-dotted lines, the airbag may be supported by the floor 3 on the lower surface 123e so as to secure a reaction force for arresting the soles FB. The airbag 123 is supported by the front wall 4 on the front surface 123d for securing a reaction force for arresting the soles FB, as shown in FIG. 26. Further alternatively, the airbag serving as the foot arresting portion may also be configured to have a certain degree of shape retention (or rigidity) when inflated, in order to be capable of arresting the soles FB without being supported by the front wall 4 or floor 3.

The foot arresting device 121 of the seat device 10F of the seventh embodiment is configured such that the inflator 122 is actuated in response to a signal fed from the not-shown control device as has received a collision signal from a collision sensor mounted on the front bumper or the like of the vehicle 1, when the occupant OP sits in a reclining posture, in other words, when the legrest 27 is tilted at such an angle as depicted in FIG. 26. The angle of tilt of the legrest 27 is detected by a not-shown sensor mounted on the shaft 28 which pivotally supports the legrest 27, or the like.

That is, the inflator 122 is configured not to be actuated when the occupant OP sits in a normal upright posture, in other words, when the legrest 27 is folded or stowed under the seat 20 as shown in FIG. 5.

The occupant arresting device 30F of the seat device 10F of the seventh embodiment is provided with the arresting devices 31 and 36 of the seat device 10 of the first embodiment in addition to the foot arresting device 121. Alternatively, the foot arresting device 121 may be combined with at least one of the arresting devices 31, 36, 41, 46, 51, 56, 61, 66, 71, 81, 86 and lifting apparatuses 101 and 101E of the foregoing embodiments to form the seat device 10F. Further alternatively, the seat device 10F that arrests and protects an occupant OP sitting in a reclining posture may be composed of the foot arresting device 121 only.

Furthermore, although the foot arresting device 121 of the seventh embodiment is stored in the legrest 27, the foot arresting device may also be configured as a foot arresting device 126 of a seat device 10G according to an eighth embodiment depicted in FIG. 28.

In the seat device 10G of the eighth embodiment, an occupant arresting device 30G includes a pelvis arresting device 31 and a leg arresting device 36 which are similar to those of the first embodiment, and a foot arresting device 126 that includes a foot arresting portion 128 for arresting soles FB of an occupant OP.

A storage position FP14 of the foot arresting device 126 is disposed in a front end portion 22e of the seat main body 22 of the seat 20. An airbag 128 which serves as a foot arresting portion, and an inflator 127 which feeds the airbag 128 with an inflation gas G are stored in the storage position FP14. The airbag 128 includes a base portion 128a which houses the inflator 127 and is secured to the storage position FP14, and an arresting body 128b which arrests the soles FB of the occupant OP. When fed with an inflation gas G, the base portion 128a protrudes from the storage position FP14 such that the front end 128aa is located between a lower end 27e of the legrest 27 and a floor 3 of the vehicle 1, and the arresting body 128b extends upward forward from the front end 128aa of the base portion 128a, and is deployed in front of left and right soles FB. A rear surface of the airbag 128 serves as an arresting plane 128c that restrains the soles FB from moving forward. When the airbag 128 is deployed, the arresting plane 128c of the arresting body 128b restrains the soles FBL and FBR of the occupant OP in a reclining posture from moving forward, thus preventing him from submarining.

The airbag 128 is supported by the front wall 4 and floor 3 of the vehicle body on the front surface 128d and lower surface 128e, thus secures a reaction force for arresting the soles FB.

Figure 29:
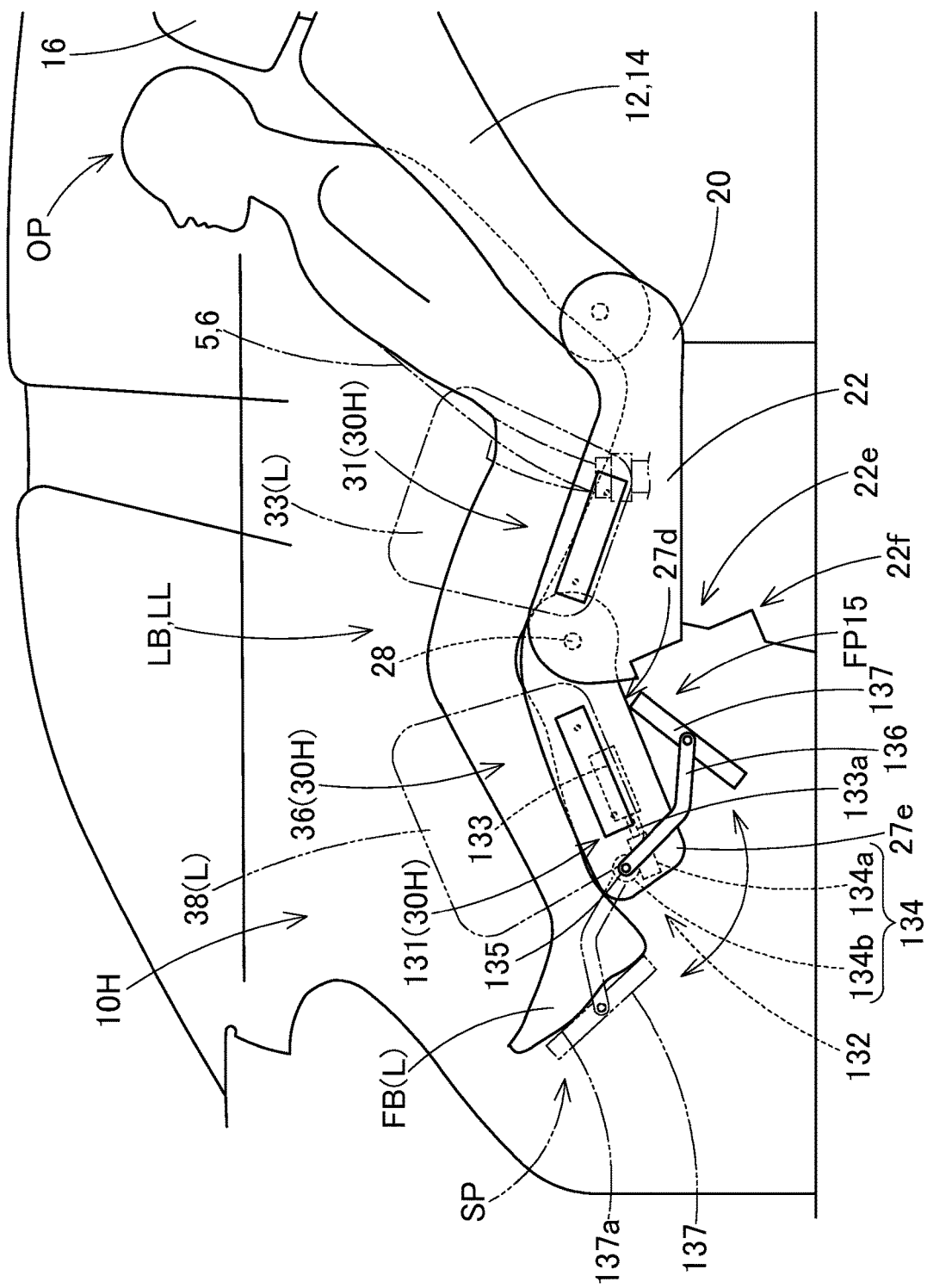
FIG. 29 is a schematic side view of a seat device according to a ninth embodiment.
Figure 30:
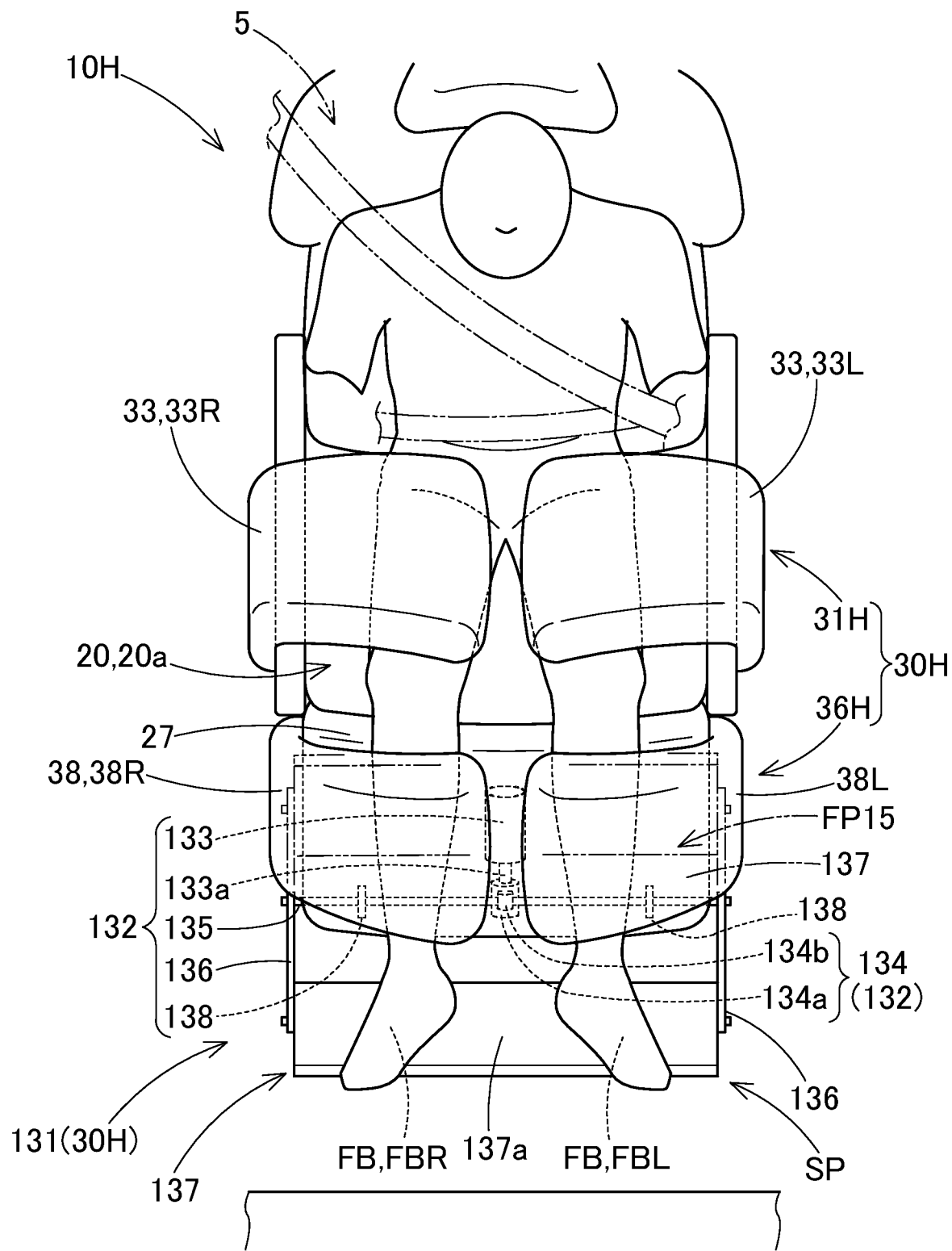
FIG. 30 is a schematic plan view of the seat device of the ninth embodiment.

The foot arresting portion for arresting soles or feet FB of an occupant OP may alternatively be composed of a shape retentive arresting bar 137 instead of an inflatable airbag 123, 128, as in a seat device 10H of a ninth embodiment depicted in FIGS. 29 and 30.

In a similar fashion to the seventh and eighth embodiments, the seat device 10H of the ninth embodiment includes a backrest 12, a seat 20, and a foot arresting device 131. The backrest 12 includes a headrest 16 on the top of the main body 14, and the seat 20 includes a main body 22 and a legrest 27 which is disposed in front of the main body 22. The foot arresting device 131 is disposed in a vicinity of a lower end (or leading end) 27e of the legrest 27.

The foot arresting device 131 includes an arresting bar 137 which has shape retention and serves as a foot arresting portion, and a deployment apparatus 132 which deploys the arresting bar 137 mechanically from a storage position FP15 disposed under the underside 27d of the legrest 27 to an arresting position SP. The arresting bar 137 is formed into a rectangular plate elongate in a left and right direction, and supported by a pair of supporting arms 136 on the left and right ends.

The deployment apparatus 132 includes an actuator 133 which is disposed in a central portion in a left and right direction of the legrest 27 and rotates a drive shaft 133a at a high speed through the use of a micro gas generator or the like, a pair of left and right supporting arms 136 which supports the arresting bar 137, a rotating shaft 135 which extends in the left and right direction to link the arms 136, a pair of bearings 138 which pivotally support the rotating shaft 135 at left and right sides, and a motion converting mechanism 134 which converts rotation of the drive shaft 133a into rotary motion of the rotating shaft 135. The motion converting mechanism 134 is composed of a worm 134a fixed to the drive shaft 133a and a worm wheel 134b which is fixed to the rotating shaft 135 and in engagement with the worm 134a. When the actuator 133 is actuated and rotates the drive shaft 133a, the worm 134a rotates, the worm wheel 134b in engagement with the worm 134a then rotates, such that the rotating shaft 135 rotates and the supporting arms 136 turn clockwise, as depicted in FIG. 29 with solid lines and double-dotted lines. Thus the arresting bar 137 is deployed from the storage position FP15 to the arresting position SP, i.e. in front of the soles FB of the occupant OP sitting in a reclining posture. An arresting plane, i.e. a rear surface, 137a of the arresting bar 137 restrains the soles FB of the occupant OP from moving forward, and protects him from submarining.

The seat device 10H of the ninth embodiment is also provided with a not-shown sensor for detecting an angle of tilt of the legrest 27, mounted on the rotatable shaft 28 supporting the legrest 27, or the like. The foot arresting device 131 of the seat device 10H is configured to be actuated only when the not-shown sensor detects that the occupant OP sits in a reclining posture, in other words, that the legrest 27 is tilted at such an angle as depicted in FIG. 29. That is, the actuator 133 is configured not to be actuated when the occupant OP sits in a normal upright posture, in other words, when the legrest 27 is folded or stowed away under the seat 20 as shown in FIG. 5.

The seat device 10H is further provided, in a lower portion of a front end of the seat 20, with a recessed region for accommodating the arresting bar 137 when the legrest 27 is stowed.

The seat device 10H of the ninth embodiment is illustrated as provided with the arresting devices 31 and 36 of the seat device 10 of the first embodiment in addition to the foot arresting device 131. Alternatively, the foot arresting device 131 may be combined with at least one of the arresting devices 31, 36, 41, 46, 51, 56, 61, 66, 71, 81, 86 and lifting apparatuses 101 and 101E of the foregoing embodiments to form the seat device 10H. Further alternatively, the seat device 10H that arrests and protects an occupant OP sitting in a reclining posture may be composed of the foot arresting device 131 only.

What is claimed is:
1. A seat device adapted to be mounted on a vehicle, comprising:
    a seat configured for supporting a lower body of an occupant of the vehicle;
    a backrest configured for supporting an upper body of the occupant; and an arresting portion stored in a storage position disposed in the seat, the arresting portion being configured to be deployed from the storage position and adapted to restrain a part of the lower body of the occupant from moving forward in the event of a collision of the vehicle, wherein the seat includes a seat main body and a legrest that extends forward and downward from the seat main body;

wherein the arresting portion includes:
- a pelvis arresting portion that is configured to be deployed from the storage position and adapted to be disposed in front of a pelvic region of the occupant for arresting the pelvic region; and
- a leg arresting portion that is configured to be deployed from the storage position and adapted to be disposed in front of lower legs of the occupant for arresting the lower legs;

wherein the storage position of the pelvis arresting portion is disposed in at least one side of the seat main body of the seat;

wherein the storage position of the leg arresting portion is disposed in the legrest; and wherein each of the pelvis arresting portion and the leg arresting portion is composed of an airbag that is stored in the storage position in a folded configuration and configured to unfold and be inflated with an inflation gas fed from a gas source.

2. The seat device of claim 1, wherein the storage position of the leg arresting portion is disposed in at least one side of the legrest.

3. The seat device of claim 1, wherein the storage position of the leg arresting portion is disposed at a central portion in a left and right direction of a surface region of the legrest.

4. The seat device of claim 1, wherein the seat is provided with a lifting apparatus that lifts a front portion of a most sunken region of the seat and is adapted for restraining buttocks of the occupant from moving forward.

* * * * *